US011895307B2

(12) United States Patent
Mammou et al.

(10) Patent No.: US 11,895,307 B2
(45) Date of Patent: Feb. 6, 2024

(54) BLOCK-BASED PREDICTIVE CODING FOR POINT CLOUD COMPRESSION

(71) Applicant: Apple Inc., Cupertino, CA (US)

(72) Inventors: Khaled Mammou, Vancouver (CA); David Flynn, Munich (DE); Alexandros Tourapis, Los Gatos, CA (US); Jungsun Kim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/062,446

(22) Filed: Oct. 2, 2020

(65) Prior Publication Data

US 2021/0105493 A1   Apr. 8, 2021

Related U.S. Application Data

(60) Provisional application No. 62/911,200, filed on Oct. 4, 2019.

(51) Int. Cl.
| | |
|---|---|
| *H04N 7/12* | (2006.01) |
| *H04N 19/20* | (2014.01) |
| *H04N 19/119* | (2014.01) |
| *H04N 19/124* | (2014.01) |
| *H04N 19/61* | (2014.01) |
| *H04N 19/176* | (2014.01) |

(Continued)

(52) U.S. Cl.
CPC ............ *H04N 19/20* (2014.11); *G06T 9/001* (2013.01); *G06T 9/40* (2013.01); *H04N 19/119* (2014.11); *H04N 19/12* (2014.11); *H04N 19/124* (2014.11); *H04N 19/136* (2014.11); *H04N 19/176* (2014.11); *H04N 19/189* (2014.11); *H04N 19/50* (2014.11); *H04N 19/61* (2014.11); *H04N 19/647* (2014.11)

(58) Field of Classification Search
CPC .................................................... H04N 19/647
See application file for complete search history.

(56) References Cited

U.S. PATENT DOCUMENTS

| | | | |
|---|---|---|---|
| 1,450,030 | A | 3/1923 | Fulson |
| 5,793,371 | A | 8/1998 | Deering |

(Continued)

FOREIGN PATENT DOCUMENTS

| | | |
|---|---|---|
| CA | 309618 | 10/2019 |
| CN | 101198945 | 6/2008 |

(Continued)

OTHER PUBLICATIONS

Sebastian Schwarz, et al., "Emerging MPEG Standards for Point Cloud Compression", IEEE Journal on Emerging and Selected Topics in Circuits and Systems, vol. 9, No. 1, Mar. 2019, pp. 133-148.

(Continued)

*Primary Examiner* — Y Lee
(74) *Attorney, Agent, or Firm* — Alexander A. Knapp; Kowert, Hood, Munyon, Rankin & Goetzel, P.C.

(57) ABSTRACT

An encoder is configured to compress point cloud information using a blocks of nodes determined from a prediction tree. A prediction tree is generated for a point cloud. Segments of the prediction tree are identified. The segments are divided into blocks that are predicted by predecessor blocks within the segments. The blocks of the prediction tree may then be encoded and may be provided for transmission to a decoder that can regenerate the point cloud from the blocks of the prediction tree.

20 Claims, 14 Drawing Sheets

(51) Int. Cl.
    *H04N 19/50*         (2014.01)
    *H04N 19/136*       (2014.01)
    *G06T 9/00*           (2006.01)
    *H04N 19/12*         (2014.01)
    *H04N 19/189*       (2014.01)
    *H04N 19/64*         (2014.01)
    *G06T 9/40*           (2006.01)

(56) References Cited

U.S. PATENT DOCUMENTS

| | | |
|---|---|---|
| 5,842,004 A | 11/1998 | Deering |
| 5,867,167 A | 2/1999 | Deering |
| 5,870,094 A | 2/1999 | Deering |
| 5,905,502 A | 5/1999 | Deering |
| 5,933,153 A | 8/1999 | Deering |
| 6,018,353 A | 1/2000 | Deering |
| 6,028,610 A | 2/2000 | Deering |
| 6,088,034 A | 7/2000 | Deering |
| 6,188,796 B1 | 2/2001 | Kadono |
| 6,215,500 B1 | 4/2001 | Deering |
| 6,239,805 B1 | 5/2001 | Deering |
| 6,256,041 B1 | 7/2001 | Deering |
| 6,307,557 B1 | 10/2001 | Deering |
| 6,429,867 B1 | 8/2002 | Deering |
| 6,459,428 B1 | 10/2002 | Burk et al. |
| 6,459,429 B1 | 10/2002 | Deering |
| 6,476,803 B1 | 11/2002 | Zhang |
| 6,522,326 B1 | 2/2003 | Deering |
| 6,522,327 B2 | 2/2003 | Deering |
| 6,525,722 B1 | 2/2003 | Deering |
| 6,525,725 B1 | 2/2003 | Deering |
| 6,531,012 B2 | 3/2003 | Ishiyama |
| 6,559,842 B1 | 5/2003 | Deering |
| 6,603,470 B1 | 8/2003 | Deering |
| 6,628,277 B1 | 9/2003 | Deering |
| 6,747,644 B1 | 6/2004 | Deering |
| 6,858,826 B2 | 2/2005 | Mueller et al. |
| 7,071,935 B1 | 7/2006 | Deering |
| 7,110,617 B2 | 9/2006 | Zhang et al. |
| 7,215,810 B2 | 5/2007 | Kaufman et al. |
| 7,373,473 B2 | 5/2008 | Bukowski et al. |
| 7,737,985 B2 | 6/2010 | Torzewski et al. |
| 7,961,934 B2 | 6/2011 | Thrun et al. |
| 8,022,951 B2 | 9/2011 | Zhirkov et al. |
| 8,040,355 B2 | 10/2011 | Burley |
| 8,055,070 B2 | 11/2011 | Bassi et al. |
| 8,315,425 B2 | 11/2012 | Appel |
| 8,411,932 B2 | 4/2013 | Liu et al. |
| 8,520,740 B2 | 8/2013 | Flachs |
| 8,566,736 B1 | 10/2013 | Jacob |
| 8,643,515 B2 | 2/2014 | Cideciyan |
| 8,718,405 B2 | 5/2014 | Fujiki |
| 8,780,112 B2 | 7/2014 | Kontkanen et al. |
| 8,805,097 B2 | 8/2014 | Ahn et al. |
| 8,884,953 B2 | 11/2014 | Chen et al. |
| 8,996,228 B1 | 3/2015 | Ferguson |
| 9,064,311 B2 | 6/2015 | Mammou et al. |
| 9,064,331 B2 | 6/2015 | Yamashita |
| 9,117,105 B2 | 8/2015 | Da |
| 9,171,383 B2 | 10/2015 | Ahn et al. |
| 9,191,670 B2 | 11/2015 | Karczewicz |
| 9,199,641 B2 | 12/2015 | Ferguson et al. |
| 9,214,042 B2 | 12/2015 | Cai et al. |
| 9,223,765 B1 | 12/2015 | Alakuijala |
| 9,234,618 B1 | 1/2016 | Zhu et al. |
| 9,256,980 B2 | 2/2016 | Kirk |
| 9,292,961 B1 | 3/2016 | Korchev |
| 9,300,321 B2 | 3/2016 | Zalik et al. |
| 9,317,965 B2 | 4/2016 | Krishnaswamy et al. |
| 9,412,040 B2 | 8/2016 | Feng |
| 9,424,672 B2 | 8/2016 | Zavodny |
| 9,430,837 B2 | 8/2016 | Fujiki |
| 9,530,225 B1 | 12/2016 | Nieves |
| 9,532,056 B2 | 12/2016 | Jiang et al. |
| 9,613,388 B2 | 4/2017 | Loss |
| 9,633,146 B2 | 4/2017 | Plummer et al. |
| 9,678,963 B2 | 6/2017 | Hernandez Londono et al. |
| 9,729,169 B2 | 8/2017 | Kalevo |
| 9,734,595 B2 | 8/2017 | Lukac et al. |
| 9,753,124 B2 | 9/2017 | Hayes |
| 9,787,321 B1 | 10/2017 | Hemmer et al. |
| 9,800,766 B2 | 10/2017 | Tsuji |
| 9,836,483 B1 | 12/2017 | Hickman |
| 9,972,129 B2 | 5/2018 | Michel et al. |
| 10,089,312 B2 | 10/2018 | Tremblay et al. |
| 10,108,867 B1 | 10/2018 | Vallespi-Gonzalez |
| 10,223,810 B2 | 3/2019 | Chou et al. |
| 10,259,164 B2 | 4/2019 | Bader |
| 10,277,248 B2 | 4/2019 | Lee |
| 10,372,728 B2 | 8/2019 | Horhammer et al. |
| 10,395,419 B1 | 8/2019 | Godzaridis |
| 10,462,485 B2 | 10/2019 | Mammou et al. |
| 10,467,756 B2 | 11/2019 | arlinsky et al. |
| 10,510,148 B2 | 12/2019 | Qui |
| 10,546,415 B2 | 1/2020 | Petkov |
| 10,559,111 B2 | 2/2020 | Sachs |
| 10,587,286 B1 | 3/2020 | Flynn |
| 10,607,373 B2 | 3/2020 | Mammou et al. |
| 10,659,816 B2 | 5/2020 | Mammou et al. |
| 10,699,444 B2 | 6/2020 | Mammou et al. |
| 10,715,618 B2 | 7/2020 | Bhaskar |
| 10,762,667 B2 | 9/2020 | Mekuria |
| 10,783,668 B2 | 9/2020 | Sinharoy et al. |
| 10,789,733 B2 | 9/2020 | Mammou et al. |
| 10,805,646 B2 | 10/2020 | Tourapis et al. |
| 10,861,196 B2 | 12/2020 | Mammou et al. |
| 10,867,413 B2 | 12/2020 | Mammou et al. |
| 10,869,059 B2 | 12/2020 | Mammou et al. |
| 10,897,269 B2 | 1/2021 | Mammou et al. |
| 10,909,725 B2 | 2/2021 | Mammou et al. |
| 10,909,726 B2 | 2/2021 | Mammou et al. |
| 10,909,727 B2 | 2/2021 | Mammou et al. |
| 10,911,787 B2 | 2/2021 | Tourapis et al. |
| 10,939,123 B2 | 3/2021 | Li |
| 10,939,129 B2 | 3/2021 | Mammou |
| 10,977,773 B2 | 4/2021 | Hemmer |
| 10,984,541 B2 | 4/2021 | Lim |
| 11,010,907 B1 | 5/2021 | Bagwell |
| 11,010,928 B2 | 5/2021 | Mammou et al. |
| 11,012,713 B2 | 5/2021 | Kim et al. |
| 11,017,566 B1 | 5/2021 | Tourapis et al. |
| 11,017,591 B2 | 5/2021 | Oh |
| 11,044,478 B2 | 6/2021 | Tourapis et al. |
| 11,044,495 B1 | 6/2021 | Dupont |
| 11,095,908 B2 | 8/2021 | Dawar |
| 11,113,845 B2 | 9/2021 | Tourapis et al. |
| 11,122,102 B2 | 9/2021 | Oh |
| 11,122,279 B2 | 9/2021 | Joshi |
| 11,132,818 B2 | 9/2021 | Mammou et al. |
| 11,200,701 B2 | 12/2021 | Aksu |
| 11,202,078 B2 | 12/2021 | Tourapis et al. |
| 11,202,098 B2 | 12/2021 | Mammou et al. |
| 11,212,558 B2 | 12/2021 | Sugio |
| 11,240,532 B2 | 2/2022 | Roimela |
| 11,252,441 B2 | 2/2022 | Tourapis et al. |
| 11,276,203 B2 | 3/2022 | Tourapis et al. |
| 11,284,091 B2 | 3/2022 | Tourapis et al. |
| 11,321,928 B2 | 5/2022 | Melkote Krishnaprasd |
| 11,363,309 B2 | 6/2022 | Tourapis et al. |
| 11,386,524 B2 | 7/2022 | Mammou et al. |
| 11,398,058 B2 | 7/2022 | Zakharchenko |
| 11,398,833 B2 | 7/2022 | Flynn et al. |
| 11,409,998 B2 | 8/2022 | Mammou et al. |
| 11,450,031 B2 | 9/2022 | Flynn |
| 11,461,935 B2 | 10/2022 | Mammou et al. |
| 11,475,605 B2 | 10/2022 | Flynn |
| 11,494,947 B2 | 11/2022 | Mammou et al. |
| 11,503,367 B2 | 11/2022 | Yea |
| 11,508,095 B2 | 11/2022 | Mammou et al. |
| 11,527,018 B2 | 12/2022 | Mammou et al. |
| 11,552,651 B2 | 1/2023 | Mammou et al. |
| 11,615,557 B2 | 3/2023 | Flynn |
| 11,620,768 B2 | 4/2023 | Flynn |
| 11,711,544 B2 | 7/2023 | Tourapis et al. |

(56) References Cited

U.S. PATENT DOCUMENTS

| | | |
|---|---|---|
| 11,727,603 B2 | 8/2023 | Mammou et al. |
| 11,748,916 B2 | 9/2023 | Mammou et al. |
| 2002/0181741 A1 | 12/2002 | Masukura |
| 2003/0066949 A1 | 4/2003 | Mueller' et al. |
| 2004/0217956 A1 | 11/2004 | Besl et al. |
| 2006/0133508 A1 | 6/2006 | Sekiguchi |
| 2007/0098283 A1 | 5/2007 | Kim et al. |
| 2007/0160140 A1 | 7/2007 | Fujisawa |
| 2008/0050047 A1 | 2/2008 | Bashyam |
| 2008/0154928 A1 | 6/2008 | Bashyam |
| 2008/0225116 A1 | 9/2008 | Kang |
| 2009/0016598 A1 | 1/2009 | Lojewski |
| 2009/0027412 A1 | 1/2009 | Burley |
| 2009/0087111 A1 | 4/2009 | Noda et al. |
| 2009/0243921 A1 | 10/2009 | Gebben et al. |
| 2009/0285301 A1 | 11/2009 | Kurata |
| 2010/0104157 A1 | 4/2010 | Doyle |
| 2010/0104158 A1 | 4/2010 | Shechtman et al. |
| 2010/0106770 A1 | 4/2010 | Taylor |
| 2010/0166064 A1 | 7/2010 | Perlman et al. |
| 2010/0208807 A1 | 8/2010 | Sikora |
| 2010/0260429 A1 | 10/2010 | Ichinose |
| 2010/0260729 A1 | 10/2010 | Cavato et al. |
| 2010/0296579 A1 | 11/2010 | Panchal et al. |
| 2011/0010400 A1 | 1/2011 | Hayes |
| 2011/0107720 A1 | 5/2011 | Oakey |
| 2011/0142139 A1 | 6/2011 | Cheng |
| 2011/0182477 A1 | 7/2011 | Tamrakar |
| 2012/0124113 A1 | 5/2012 | Zalik et al. |
| 2012/0188344 A1 | 7/2012 | Imai |
| 2012/0246166 A1 | 9/2012 | Krishnaswamy et al. |
| 2012/0300839 A1 | 11/2012 | Sze et al. |
| 2012/0314026 A1 | 12/2012 | Chen et al. |
| 2013/0034150 A1 | 2/2013 | Sadafale |
| 2013/0094777 A1 | 4/2013 | Nomura et al. |
| 2013/0106627 A1 | 5/2013 | Cideciyan |
| 2013/0156101 A1 | 6/2013 | Lu |
| 2013/0195352 A1 | 8/2013 | Nystad |
| 2013/0202197 A1 | 8/2013 | Reeler |
| 2013/0321418 A1 | 12/2013 | Kirk |
| 2013/0322738 A1 | 12/2013 | Oh |
| 2013/0329778 A1 | 12/2013 | Su et al. |
| 2014/0036033 A1 | 2/2014 | Takahashi |
| 2014/0098855 A1 | 4/2014 | Gu et al. |
| 2014/0125671 A1 | 5/2014 | Vorobyov et al. |
| 2014/0176672 A1 | 6/2014 | Lu |
| 2014/0198097 A1 | 7/2014 | Evans |
| 2014/0204088 A1 | 7/2014 | Kirk et al. |
| 2014/0294088 A1 | 10/2014 | Sung et al. |
| 2014/0334557 A1 | 11/2014 | Schierl et al. |
| 2014/0334717 A1 | 11/2014 | Jiang |
| 2015/0003723 A1 | 1/2015 | Huang et al. |
| 2015/0092834 A1 | 4/2015 | Cote et al. |
| 2015/0139560 A1 | 5/2015 | DeWeert et al. |
| 2015/0160450 A1 | 6/2015 | Ou et al. |
| 2015/0186744 A1 | 7/2015 | Nguyen et al. |
| 2015/0268058 A1 | 9/2015 | Samarasekera et al. |
| 2016/0035081 A1 | 2/2016 | Stout et al. |
| 2016/0071312 A1 | 3/2016 | Laine et al. |
| 2016/0086353 A1 | 3/2016 | Lukac et al. |
| 2016/0100151 A1 | 4/2016 | Schaffer et al. |
| 2016/0142697 A1 | 5/2016 | Budagavi et al. |
| 2016/0165241 A1 | 6/2016 | Park |
| 2016/0286215 A1 | 9/2016 | Gamei |
| 2016/0295219 A1 | 10/2016 | Ye et al. |
| 2017/0039765 A1 | 2/2017 | Zhou et al. |
| 2017/0063392 A1 | 3/2017 | Kalevo |
| 2017/0118675 A1 | 4/2017 | Boch |
| 2017/0155402 A1 | 6/2017 | Karkkainen |
| 2017/0155922 A1 | 6/2017 | Yoo |
| 2017/0214943 A1 | 7/2017 | Cohen et al. |
| 2017/0220037 A1 | 8/2017 | Berestov |
| 2017/0243405 A1 | 8/2017 | Brandt et al. |
| 2017/0247120 A1 | 8/2017 | Miller |
| 2017/0249401 A1 | 8/2017 | ckart et al. |
| 2017/0323617 A1 | 11/2017 | Yang |
| 2017/0337724 A1 | 11/2017 | Gervais |
| 2017/0347100 A1 | 11/2017 | Chou et al. |
| 2017/0347120 A1 | 11/2017 | Chou et al. |
| 2017/0347122 A1 | 11/2017 | Chou et al. |
| 2017/0358063 A1 | 12/2017 | Chen |
| 2018/0018786 A1 | 1/2018 | Jakubiak |
| 2018/0053324 A1 | 2/2018 | Cohen et al. |
| 2018/0063543 A1 | 3/2018 | Reddy |
| 2018/0075622 A1 | 3/2018 | Tuffreau et al. |
| 2018/0189982 A1 | 7/2018 | Laroche et al. |
| 2018/0192061 A1 | 7/2018 | He |
| 2018/0253867 A1 | 9/2018 | Laroche |
| 2018/0260416 A1 | 9/2018 | Elkaim |
| 2018/0268570 A1 | 9/2018 | Budagavi et al. |
| 2018/0308249 A1 | 10/2018 | Nash et al. |
| 2018/0330504 A1 | 11/2018 | Karlinsky et al. |
| 2018/0338017 A1 | 11/2018 | Mekuria |
| 2018/0342083 A1 | 11/2018 | Onno et al. |
| 2018/0365898 A1 | 12/2018 | Costa |
| 2019/0018730 A1 | 1/2019 | Charamisinau et al. |
| 2019/0020880 A1 | 1/2019 | Wang |
| 2019/0026956 A1 | 1/2019 | Gausebeck |
| 2019/0045157 A1 | 2/2019 | Venshtain |
| 2019/0081638 A1 | 3/2019 | Mammou et al. |
| 2019/0087978 A1 | 3/2019 | Tourapis et al. |
| 2019/0087979 A1 | 3/2019 | Mammou et al. |
| 2019/0088004 A1 | 3/2019 | Lucas et al. |
| 2019/0108655 A1 | 4/2019 | Lasserre |
| 2019/0114504 A1 | 4/2019 | Vosoughi et al. |
| 2019/0114809 A1 | 4/2019 | Vosoughi et al. |
| 2019/0114830 A1 | 4/2019 | Bouazizi |
| 2019/0116257 A1 | 4/2019 | Rhyne |
| 2019/0116357 A1 | 4/2019 | Tian et al. |
| 2019/0122393 A1 | 4/2019 | Sinharoy |
| 2019/0089987 A1 | 5/2019 | Won et al. |
| 2019/0139266 A1 | 5/2019 | Budagavi et al. |
| 2019/0156519 A1 | 5/2019 | Mammou et al. |
| 2019/0156520 A1 | 5/2019 | Mammou et al. |
| 2019/0195616 A1 | 6/2019 | Cao et al. |
| 2019/0197739 A1 | 6/2019 | Sinharoy et al. |
| 2019/0199995 A1 | 6/2019 | Yip et al. |
| 2019/0204076 A1 | 7/2019 | Nishi et al. |
| 2019/0262726 A1 | 8/2019 | Spencer et al. |
| 2019/0289306 A1 | 9/2019 | Zhao |
| 2019/0304139 A1 | 10/2019 | Joshi et al. |
| 2019/0311502 A1 | 10/2019 | Mammou et al. |
| 2019/0313110 A1 | 10/2019 | Mammou et al. |
| 2019/0318488 A1 | 10/2019 | Lim |
| 2019/0318519 A1 | 10/2019 | Graziosi et al. |
| 2019/0340306 A1 | 11/2019 | Harrison |
| 2019/0341930 A1 | 11/2019 | Pavlovic |
| 2019/0371051 A1 | 12/2019 | Dore et al. |
| 2019/0392651 A1 | 12/2019 | Graziosi |
| 2020/0005518 A1 | 1/2020 | Graziosi |
| 2020/0013235 A1 | 1/2020 | Tsai et al. |
| 2020/0020132 A1 | 1/2020 | Sinharoy et al. |
| 2020/0020133 A1 | 1/2020 | Najaf-Zadeh et al. |
| 2020/0021847 A1 | 1/2020 | Kim et al. |
| 2020/0027248 A1 | 1/2020 | Verschaeve |
| 2020/0043220 A1 | 2/2020 | Mishaev |
| 2020/0045344 A1 | 2/2020 | Boyce et al. |
| 2020/0104976 A1 | 4/2020 | Mammou et al. |
| 2020/0105024 A1 | 4/2020 | Mammou et al. |
| 2020/0107022 A1 | 4/2020 | Ahn et al. |
| 2020/0107048 A1 | 4/2020 | Yea |
| 2020/0111237 A1 | 4/2020 | Tourapis et al. |
| 2020/0137399 A1 | 4/2020 | Li et al. |
| 2020/0151913 A1 | 5/2020 | Budagavi |
| 2020/0153885 A1 | 5/2020 | Lee |
| 2020/0195946 A1 | 6/2020 | Choi |
| 2020/0204808 A1 | 6/2020 | Graziosi |
| 2020/0217937 A1 | 7/2020 | Mammou et al. |
| 2020/0219285 A1 | 7/2020 | Faramarzi et al. |
| 2020/0219288 A1 | 7/2020 | Joshi |
| 2020/0219290 A1 | 7/2020 | Tourapis et al. |
| 2020/0228836 A1 | 7/2020 | Schwarz et al. |
| 2020/0244993 A1 | 7/2020 | Schwarz et al. |
| 2020/0260063 A1 | 8/2020 | Hannuksela |

(56) References Cited

U.S. PATENT DOCUMENTS

| | | |
|---|---|---|
| 2020/0273208 A1 | 8/2020 | Mammou et al. |
| 2020/0273258 A1 | 8/2020 | Lasserre et al. |
| 2020/0275129 A1 | 8/2020 | Deshpande |
| 2020/0279435 A1 | 9/2020 | Kuma |
| 2020/0286261 A1 | 9/2020 | Faramarzi et al. |
| 2020/0288171 A1 | 9/2020 | Hannuksela et al. |
| 2020/0294271 A1 | 9/2020 | Ilola |
| 2020/0302571 A1 | 9/2020 | Schwartz |
| 2020/0302578 A1 | 9/2020 | Graziosi |
| 2020/0302621 A1 | 9/2020 | Kong |
| 2020/0302651 A1 | 9/2020 | Flynn |
| 2020/0302655 A1 | 9/2020 | Oh |
| 2020/0359035 A1 | 11/2020 | Chevet |
| 2020/0359053 A1 | 11/2020 | Yano |
| 2020/0366941 A1 | 11/2020 | Sugio et al. |
| 2020/0374559 A1 | 11/2020 | Fleureau et al. |
| 2020/0380765 A1 | 12/2020 | Thudor et al. |
| 2020/0396489 A1 | 12/2020 | Flynn |
| 2020/0413096 A1 | 12/2020 | Zhang |
| 2021/0005006 A1 | 1/2021 | Oh |
| 2021/0006805 A1 | 1/2021 | Urban et al. |
| 2021/0006833 A1 | 1/2021 | Tourapis et al. |
| 2021/0012536 A1 | 1/2021 | Mammou et al. |
| 2021/0012538 A1 | 1/2021 | Wang |
| 2021/0014293 A1 | 1/2021 | Yip |
| 2021/0021869 A1 | 1/2021 | Wang |
| 2021/0027505 A1 | 1/2021 | Yano et al. |
| 2021/0029381 A1 | 1/2021 | Zhang et al. |
| 2021/0056732 A1 | 2/2021 | Han |
| 2021/0074029 A1 | 3/2021 | Fleureau |
| 2021/0084333 A1 | 3/2021 | Zhang |
| 2021/0090301 A1 | 3/2021 | Mammou et al. |
| 2021/0097723 A1 | 4/2021 | Kim et al. |
| 2021/0097725 A1 | 4/2021 | Mammou et al. |
| 2021/0097726 A1 | 4/2021 | Mammou et al. |
| 2021/0099701 A1 | 4/2021 | Tourapis et al. |
| 2021/0103780 A1 | 4/2021 | Mammou et al. |
| 2021/0104014 A1 | 4/2021 | Kolb, V |
| 2021/0104073 A1 | 4/2021 | Yea et al. |
| 2021/0104075 A1 | 4/2021 | Mammou et al. |
| 2021/0105022 A1 | 4/2021 | Flynn et al. |
| 2021/0105493 A1 | 4/2021 | Mammou et al. |
| 2021/0105504 A1 | 4/2021 | Hur et al. |
| 2021/0112281 A1 | 4/2021 | Wang |
| 2021/0118190 A1 | 4/2021 | Mammou et al. |
| 2021/0119640 A1 | 4/2021 | Mammou et al. |
| 2021/0142522 A1 | 5/2021 | Li |
| 2021/0150765 A1 | 5/2021 | Mammou |
| 2021/0150766 A1 | 5/2021 | Mammou et al. |
| 2021/0150771 A1 | 5/2021 | Huang |
| 2021/0166432 A1 | 6/2021 | Wang |
| 2021/0166436 A1 | 6/2021 | Zhang |
| 2021/0168386 A1 | 6/2021 | Zhang |
| 2021/0183112 A1 | 6/2021 | Mammou et al. |
| 2021/0185331 A1 | 6/2021 | Mammou et al. |
| 2021/0195162 A1 | 6/2021 | Chupeau et al. |
| 2021/0201541 A1 | 7/2021 | Lasserre |
| 2021/0203989 A1 | 7/2021 | Wang |
| 2021/0211724 A1 | 7/2021 | Kim et al. |
| 2021/0217139 A1 | 7/2021 | Yano |
| 2021/0217203 A1 | 7/2021 | Kim et al. |
| 2021/0217206 A1 | 7/2021 | Flynn |
| 2021/0218969 A1 | 7/2021 | Lasserre |
| 2021/0218994 A1 | 7/2021 | Flynn |
| 2021/0233281 A1 | 7/2021 | Wang et al. |
| 2021/0248784 A1 | 8/2021 | Gao |
| 2021/0248785 A1 | 8/2021 | Zhang |
| 2021/0256735 A1 | 8/2021 | Tourapis et al. |
| 2021/0258610 A1 | 8/2021 | Iguchi |
| 2021/0264640 A1 | 8/2021 | Mammou et al. |
| 2021/0264641 A1 | 8/2021 | Iguchi |
| 2021/0266597 A1 | 8/2021 | Kim et al. |
| 2021/0281874 A1 | 9/2021 | Lasserre |
| 2021/0295569 A1 | 9/2021 | Sugio |
| 2021/0319593 A1 | 10/2021 | Flynn |
| 2021/0337121 A1 | 10/2021 | Johnson et al. |
| 2021/0383576 A1 | 12/2021 | Olivier |
| 2021/0398352 A1 | 12/2021 | Tokumo |
| 2021/0400280 A1 | 12/2021 | Zaghetto |
| 2021/0407147 A1 | 12/2021 | Flynn |
| 2021/0407148 A1 | 12/2021 | Flynn |
| 2022/0020211 A1 | 1/2022 | Vytyaz |
| 2022/0030258 A1 | 1/2022 | Zhang |
| 2022/0070493 A1 | 3/2022 | Mammou |
| 2022/0084164 A1 | 3/2022 | Hur |
| 2022/0101555 A1 | 3/2022 | Zhang |
| 2022/0116659 A1 | 4/2022 | Pesonen |
| 2022/0164994 A1 | 5/2022 | Joshi |
| 2022/0239956 A1 | 7/2022 | Tourapis et al. |
| 2022/0405533 A1 | 12/2022 | Mammou et al. |
| 2023/0005188 A1 | 1/2023 | Tourapis et al. |
| 2023/0169658 A1 | 6/2023 | Rhodes |

FOREIGN PATENT DOCUMENTS

| | | |
|---|---|---|
| CN | 10230618 | 1/2012 |
| CN | 102428698 | 4/2012 |
| CN | 102630011 | 8/2012 |
| CN | 103329524 | 9/2013 |
| CN | 103366006 | 10/2013 |
| CN | 103944580 | 7/2014 |
| CN | 104156972 | 11/2014 |
| CN | 104408689 | 3/2015 |
| CN | 105261060 | 1/2016 |
| CN | 105818167 | 8/2016 |
| CN | 106651942 | 5/2017 |
| CN | 106846425 | 6/2017 |
| CN | 107155342 | 9/2017 |
| CN | 108632607 | 6/2019 |
| EP | 1745442 | 1/2007 |
| EP | 2533213 | 12/2012 |
| EP | 3429210 | 1/2019 |
| EP | 3496388 | 6/2019 |
| EP | 3614674 | 2/2020 |
| EP | 3751857 | 12/2020 |
| JP | 2013111948 | 6/2013 |
| WO | 200004506 | 1/2000 |
| WO | 2008129021 | 10/2008 |
| WO | 2013022540 | 2/2013 |
| WO | 2018050725 | 3/2018 |
| WO | 2018094141 | 5/2018 |
| WO | 2019011636 | 1/2019 |
| WO | 2019013430 | 1/2019 |
| WO | 2019076503 | 4/2019 |
| WO | 2019078696 | 4/2019 |
| WO | 2019093834 | 5/2019 |
| WO | 2019129923 | 7/2019 |
| WO | 2019135024 | 7/2019 |
| WO | 2019143545 | 7/2019 |
| WO | 2019194522 | 10/2019 |
| WO | 2019199415 | 10/2019 |
| WO | 20190197708 | 10/2019 |
| WO | 2019069711 | 11/2019 |
| WO | 2020012073 | 1/2020 |
| WO | 2020066680 | 2/2020 |

OTHER PUBLICATIONS

Li Li, et al., Efficient Projected Frame Padding for Video-based Point Cloud Compression, IEEE Transactions on Multimedia, doi: 10.100/TMM.2020.3016894, 2020, pp. 1-14.

Lujia Wang, et al., "Point-cloud Compression Using Data Independent Method—A 3D Discrete Cosine Transform Approach", in Proceedings of the 2017 IEEE International Conference on Information and Automation (ICIA), Jul. 2017, pp. 1-6.

Ismael Daribo, et al., "Efficient Rate-Distortion Compression on Dynamic Point Cloud for Grid-Pattern-Based 3D Scanning Systems", 3D Research 3.1, Springer, 2012, pp. 1-9.

Yiting Shao, et al., "Attribute Compression of 3D Point Clouds Using Laplacian Sparsity Optimized Graph Transform", 2017 IEEE Visual Communications and Image Processing (VCIP), IEEE, 2017, p. 1-4.

(56) References Cited

OTHER PUBLICATIONS

Siheng Chen, et al., "Fast Resampling of 3D Point Clouds via Graphs", arX1v:1702.06397v1, Feb. 11, 2017, pp. 1-15.
Nahid Sheikhi Pour, "Improvements for Projection-Based Point Cloud Compression", MS Thesis, 2018, pp. 1-75.
Robert Skupin, et al., "Multiview Point Cloud Filtering for Spatiotemporal Consistency", VISAPP 2014—International Conference on Computer Vision Theory and Applications, 2014, pp. 531-538.
International Search Report and Written Opinion from PCT/US2020/054168, dated Jan. 15, 2021, pp. 1-16.
Bin Lu, et al., "Massive Point Cloud Space Management Method Based on Octree-Like Encoding", Arabian Journal for Science Engineering, https://doi.org/10.1007/s13369-019-03968-7, 2019, pp. 1-15.
Stefan Gumhold et al, "Predictive Point-Cloud Compression", dated Jul. 31, 2005, pp. 1-7.
Pierre-Marie Gandoin et al, "Progressive Lossless Compression of Arbitrary Simplicial Complexes", Dated Jul. 1, 2002, pp. 1-8.
Ruwen Schnabel et al., "Octree-based Point-Cloud Compression", Eurographics Symposium on Point-Based Graphics, 2006, pp. 1-11.
Yuxue Fan et al., "Point Cloud Compression Based on Hierarchical Point Clustering", Signal and Information Processing Association Annual Summit and Conference (APSIPA), IEEE, 2013, pp. 1-7.
Kammert, et al., "Real-time Compression of Point Cloud Streams", 2012 IEEE International Conference on Robotics and Automation, RiverCentre, Saint Paul, Minnesota, USA, May 14-18, 2012, pp. 778-785.
Garcia, et al., "Context-Based Octree Coding for Point Cloud Video", 2017 IEEE International Conference on Image Processing (ICIP), 2017, pp. 1412-1416.
Merry et al., Compression of dense and regular point clouds, Proceedings of the 4th international conference on Computer graphics, virtual reality, visualisation and interaction in Africa (pp. 15-20). ACM. (Jan. 2006).
Lustosa et al., Database system support of simulation data, Proceedings of the VLDB Endowment 9.13 (2016): pp. 1329-1340.
Hao Liu, et al., "A Comprehensive Study and Comparison of Core Technologies for MPEG 3D Point Cloud Compression", arXiv:1912.09674v1, Dec. 20, 2019, pp. 1-17.
Styliani Psomadaki, "Using a Space Filing Curve for the Management of Dynamic Point Cloud Data in a Relational DBMS", Nov. 2016, pp. 1-158.
Remi Cura et al, "Implicit Lod for Processing and Classification in Point Cloud Servers", dated Mar. 4, 2016, pp. 1-18.
Yan Huang et al, Octree-Based Progressive Geometry Coding of Point Clouds, dated Jan. 1, 2006, pp. 1-10.
Khaled Mammou, et al., "G-PCC codec description v1", International Organisation for Standardisation, ISO/IEC JTC1/SC29/WG11, Oct. 2018, pp. 1-32.
"V-PCC Codec Description", 127. MPEG Meeting; Jul. 8, 2019-Jul. 12, 2019; Gothenburg; (Motion Picture Expert Group or ISO/IEC JTC1/SC29/WG), dated Sep. 25, 2019.
G-PPC Codec Description, 127. MPEG Meeting; Jul. 8, 2019-Jul. 12, 2019; Gothenburg; (Motion Picture Expert Group or ISO/IEC JTC1/SC29/WG),dated Sep. 6, 2019.
Jianqiang Liu et al, "Data-Adaptive Packing Method for Compresssion of Dynamic Point Cloud Sequences", dated Jul. 8, 2019, pp. 904-909.
Jorn Jachalsky et al, "D4.2.1 Scene Analysis with Spatio-Temporal", dated Apr. 30, 2013, pp. 1-60.
Lasserre S et al, "Global Motion Compensation for Point Cloud Compression in TMC3", dated Oct. 3, 2018, pp. 1-28.
D. Graziosi et al, "An overview of ongoing point cloud compression standardization activities: video-based (V-PCC) and geometry-based (G-PCC)" Asipa Transactions on Signal and Information Processing, vol. 9, dated Apr. 30, 2020, pp. 1-17.
"Continuous improvement of study text of ISO-IEC CD 23090-5 Video-Based Point Cloud Compression" dated May 8, 2019, pp. 1-140.

Mehlem D. et al, "Smoothing considerations for V-PCC", dated Oct. 2, 2019, pp. 1-8.
Flynn D et al, "G-PCC Bypass coding of bypass bins", dated Mar. 21, 2019, pp. 1-3.
Sharman K et al, "CABAC Packet-Based Stream", dated Nov. 18, 2011, pp. 1-6.
Lasserre S et al, "On bypassed bit coding and chunks", dated Apr. 6, 2020, pp. 1-3.
David Flynn et al, "G-pcc low latency bypass bin coding". dated Oct. 3, 2019, pp. 1-4.
Chuan Wang, et al, "Video Vectorization via Tetrahedral Remeshing", IEEE Transactions on Image Processing, vol. 26, No. 4, Apr. 2017, pp. 1833-1844.
Keming Cao, et al., "Visual Quality of Compressed Mesh and Point Cloud Sequences", IEEE Access, vol. 8, 2020. pp. 171203-171217.
W. Zhu, et al., "Lossless point cloud geometry compression via binary tree partition and intra prediction," 2017 IEEE 19th International Workshop on Multimedia Signal Prcoessing (MMSP), 2017, pp. 1-6, doi: 1.1109/MMSP.2017.8122226 (Year 2017).
Pragyana K. Mishra, "Image and Depth Coherent Surface Description", Doctoral dissertation, Carnegie Mellon University, The Robotics Institute, Mar. 2005, pp. 1-152.
Robert Cohen, "CE 3.2 point-based prediction for point loud compression", dated Apr. 2018, pp. 1-6.
Jang et al., Video-Based Point-Cloud-Compression Standard in MPEG: From Evidence Collection to Committee Draft [Standards in a Nutshell], IEEE Signal Processing Magazine, Apr. 2019.
Ekekrantz, Johan, et al., "Adaptive Cost Function for Pointcloud Registration," arXiv preprint arXiv: 1704.07910 (2017), pp. 1-10.
Vincente Morell, et al., "Geometric 3D point cloud compression", Copyright 2014 Elsevier B.V. All rights reserved, pp. 1-18.
U.S. Appl. No. 17/523,826, filed Nov. 10, 2021, Mammou, et a.
Chou, et al., "Dynamic Polygon Clouds: Representation and Compression for VR/AR", Arxiv ID: 1610.00402, Published Oct. 3, 2016, pp. 1-28.
U.S. Appl. No. 17/804,477, filed May 27, 2022, Khaled Mammou, et al.
Jingming Dong, "Optimal Visual Representation Engineering and Learning for Computer Vision", Doctoral Dissertation, UCLA, 2017, pp. 1-151.
Khaled Mammou et al, "Working Draft of Point Cloud Coding for Category 2 (Draft 1)", dated Apr. 2018, pp. 1-38.
Khaled Mammou et al , "Input Contribution", dated Oct. 8, 2018, pp. 1-42.
Benjamin Bross et al, "High Effeciency Video Coding (HEVC) Text Specification Draft 8", dated Jul. 23, 2012, pp. 1-86.
JunTaek Park et al, "Non-Overlapping Patch Packing in TMC2 with HEVC-SCC", dated Oct. 8, 2018, pp. 1-6.
U.S. Appl. No. 17/718,647, filed Apr. 12, 2022, Alexandros Tourapis, et al.
Cohen Robert A et al, "Point Cloud Attribute Compression Using 3-D Intra Prediction and Shape-Adaptive Transforms", dated Mar. 30, 2016, pp. 141-150.
U.S. Appl. No. 17/691,754, filed Mar. 10, 2022, Khaled Mammou.
Wikipedia, ""k-d tree"", Aug. 1, 2019, Retrieved from URL: https://en.wikipedia.org/w.indec.php?title=Kd_tree&oldid=908900837, pp. 1-9.
Tilo Ochotta et al, "Image-Based Surface Compression", dated Sep. 1, 2008, pp. 1647-1663.
Dong Liu, et al., "Three-Dimensional Point-Cloud Plus Patches: Towards Model-Based Image Coding in the Cloud", 2015 IEEE International Conference on Multimedia Big Data, IEEE Computer Society, pp. 395-400.
Tim Golla et al., "Real-time Point Cloud Compression", IROS, 2015, pp. 1-6.
Jae-Kyun, et al., "Large-Scale 3D Point Cloud Compression Using Adaptive Radial Distance Prediction in Hybrid Coordinate Domains", IEEE Journal of Selected Topics in Signal Processing, vol. 9, No. 3, Apr. 2015, pp. 1-14.
R. Mekuria, et al., "Design, Implementation and Evaluation of a Point Cloud Codec for Tele-Immersive Video", IEEE Transactions on Circuits and Systems for Video Technology 27.4, 2017, pp. 1-14.

(56) References Cited

OTHER PUBLICATIONS

David Flynn, "International Organisation for Standardisation Organisation International De Normalisation ISO/IEC JTC1/SC29/WG11 Coding of Moving Pictures and Audio", dated Apr. 2020. pp. 1-9.
"David Flynn et al., ""G-PCC: A hierarchical geometry slice structure"", MPEG Meeting, Retrieved from http://phenix.intevry.fr/mpeg/doc_end_user/documents/131_Online/wg11/m54677-v1-m54677_vl.zip, Jun. 28, 2020, pp. 1-9".
""'G-PCC Future Enchancements'"", MPEG Metting, Oct. 7-11, 2019, (Motion Picture Expert Group of ISO/IECJTC1/SC29-WG11), Retrieved from http://phenix.int-evry.fr/mpeg/doc_end_user/documents/128_Geneva/wg11/w18887.zipw18887/w18887 on Dec. 23, 2019, pp. 1-30".
Miska M. Hannuksela, "On Slices and Tiles", JVET Meeting, The Joint Video Exploration Team of ISO/IEC, Sep. 25, 2018, pp. 1-3.
U.S. Appl. No. 18/063,592, filed Dec. 8, 2022, Khaled Mammou, et al.
Liu Chao, "Research on point cloud data processing and reconstruction," Full-text Database, Feb. 7, 2023.
U.S. Appl. No. 18/189,099, filed Mar. 23, 2023, Kjungsun Kim, et al.
U.S. Appl. No. 17/157,833, filed Jan. 25, 2021, Khaled Mammou.
U.S. Appl. No. 18/052,803, filed Nov. 4, 2022, Mammou, et al.

US 11,895,307 B2

BLOCK-BASED PREDICTIVE CODING FOR POINT CLOUD COMPRESSION

PRIORITY CLAIM

This application claims benefit of priority to U.S. Provisional Application Ser. No. 62/911,200, entitled "BLOCK-BASED PREDICTIVE CODING FOR POINT CLOUD COMPRESSION," filed Oct. 4, 2019, and which is incorporated herein by reference in its entirety.

BACKGROUND

Technical Field

This disclosure relates generally to compression and decompression of point clouds comprising a plurality of points, each having associated spatial and/or attribute information.

Description of the Related Art

Various types of sensors, such as light detection and ranging (LIDAR) systems, 3-D-cameras, 3-D scanners, etc. may capture data indicating positions of points in three dimensional space, for example positions in the X, Y, and Z planes. Also, such systems may further capture attribute information in addition to spatial information for the respective points, such as color information (e.g. RGB values), intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit.

SUMMARY OF EMBODIMENTS

In various embodiments, block-based predictive coding techniques are implemented to compress or otherwise encode information for point clouds, such as spatial or other geometric information or other attribute values. A prediction tree is generated for a point cloud. Segments of the prediction tree are identified. The segments are divided into blocks that are predicted by predecessor blocks within the segments. The blocks of the prediction tree may then be encoded and may be provided for transmission to a decoder that can regenerate the point cloud from the blocks of the prediction tree.

Figure 1:
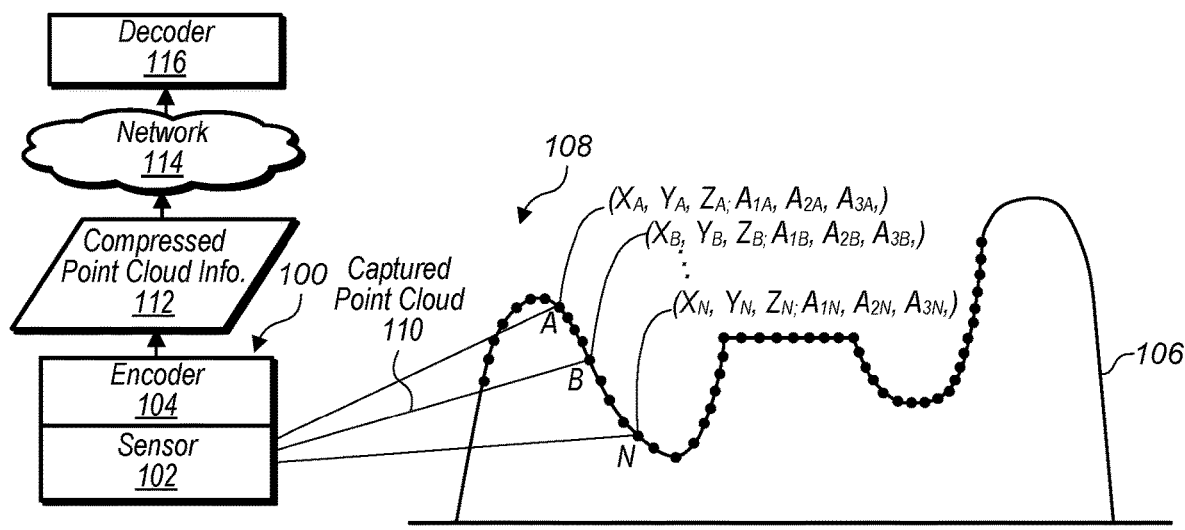
FIG. 1 illustrates a system comprising a sensor that captures information for points of a point cloud and an encoder that compresses attribute information and/or spatial information of the point cloud, where the compressed point cloud information is sent to a decoder, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture point clouds comprising thousands or millions of points in 2-D or 3-D space, such as via LIDAR systems, has increased. Also, the development of advanced display technologies, such as virtual reality or augmented reality systems, has increased potential uses for point clouds. However, point cloud files are often very large and may be costly and time-consuming to store and transmit. For example, communication of point clouds over private or public networks, such as the Internet, may require considerable amounts of time and/or network resources, such that some uses of point cloud data, such as real-time uses, may be limited. Also, storage requirements of point cloud files may consume a significant amount of storage capacity of devices storing the point cloud files, which may also limit potential applications for using point cloud data.

In some embodiments, an encoder may be used to generate a compressed point cloud to reduce costs and time associated with storing and transmitting large point cloud files. In some embodiments, a system may include an encoder that compresses attribute information and/or spatial information (also referred to herein as geometry information) of a point cloud file such that the point cloud file may be stored and transmitted more quickly than non-compressed point clouds and in a manner such that the point cloud file may occupy less storage space than non-compressed point clouds. In some embodiments, compression of spatial information and/or attributes of points in a point cloud may enable a point cloud to be communicated over a network in real-time or in near real-time. For example, a system may include a sensor that captures spatial information and/or attribute information about points in an environment where the sensor is located, wherein the captured points and corresponding attributes make up a point cloud. The system may also include an encoder that compresses the captured point cloud attribute information. The compressed attribute information of the point cloud may be sent over a network in real-time or near real-time to a decoder that decompresses the compressed attribute information of the point cloud. The decompressed point cloud may be further processed, for example to make a control decision based on the surrounding environment at the location of the sensor. The control decision may then be communicated back to a device at or near the location of the sensor, wherein the device receiving the control decision implements the control decision in real-time or near real-time. In some embodiments, the decoder may be associated with an augmented reality system and the decompressed spatial and/or attribute information may be displayed or otherwise used by the augmented reality system. In some embodiments, compressed attribute information for a point cloud may be sent with compressed spatial information for points of the point cloud. In other embodiments, spatial information and attribute information may be separately encoded and/or separately transmitted to a decoder.

In some embodiments, a system may include a decoder that receives one or more point cloud files comprising compressed attribute information via a network from a remote server or other storage device that stores the one or more point cloud files. For example, a 3-D display, a holographic display, or a head-mounted display may be manipulated in real-time or near real-time to show different portions of a virtual world represented by point clouds. In order to update the 3-D display, the holographic display, or the head-mounted display, a system associated with the decoder may request point cloud files from the remote server based on user manipulations of the displays, and the point cloud files may be transmitted from the remote server to the decoder and decoded by the decoder in real-time or near real-time. The displays may then be updated with updated point cloud data responsive to the user manipulations, such as updated point attributes.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in a point cloud. For example, in some embodiments, a gyroscope or accelerometer, may capture motion information to be included in a point cloud as an attribute associated with one or more points of the point cloud. For example, a vehicle equipped with a LIDAR system, a 3-D camera, or a 3-D scanner may include the vehicle's direction and speed in a point cloud captured by the LIDAR system, the 3-D camera, or the 3-D scanner. For example, when points in a view of the vehicle are captured they may be included in a point cloud, wherein the point cloud includes the captured points and associated motion information corresponding to a state of the vehicle when the points were captured.

In some embodiments, attribute information may comprise string values, such as different modalities. For example attribute information may include string values indicating a modality such as "walking", "running", "driving", etc. In some embodiments, an encoder may comprise a "string-value" to integer index, wherein certain strings are associated with certain corresponding integer values. In some embodiments, a point cloud may indicate a string value for a point by including an integer associated with the string value as an attribute of the point. The encoder and decoder may both store a common string value to integer index, such that the decoder can determine string values for points based on looking up the integer value of the string attribute of the point in a string value to integer index of the decoder that matches or is similar to the string value to integer index of the encoder.

In some embodiments, an encoder compresses and encodes geometric or other spatial information of a point cloud in addition to compressing attribute information for attributes of the points of the point cloud.

In some embodiments, some applications may be sensitive to the latency or time that is taken to encode and decode point cloud. While some point cloud encoding techniques may implement features that provide good compression results, such as octrees utilized in Geometry-based Point Cloud Compression (G-PCC), the time to encode and decode point cloud data may limit the utilization of the compression in latency sensitive applications. For example, while octree techniques may provide excellent compression results for dense point cloud, the compression gains achieved for a sparse point cloud (e.g. a sparse Lidar point cloud) may not be as effective, as the computational complexity for building the octree and computing features of the octree, such as neighborhood occupancy information, may result in computational costs that outweigh the obtained compression gains. Furthermore, in some scenarios, some coding techniques, like octree-based coding, may incur a high latency (e.g., by using a high number of points before the compression/decompression process could start). Predictive coding techniques, in various embodiments, may provide various performance benefits, including low latency implementations, which can achieve more performant computational costs and lower latency. For example, predictive coding techniques as discussed below may be implemented for low latency or other latency sensitive applications, allow for low delay streaming, and be implemented with low complexity decoding.

FIG. 1 illustrates a system comprising a sensor that captures information for points of a point cloud and an encoder that compresses spatial and/or attribute information of the point cloud, where the compressed spatial and/or attribute information is sent to a decoder, according to some embodiments.

System 100 includes sensor 102 and encoder 104. Sensor 102 captures a point cloud 110 comprising points representing structure 106 in view 108 of sensor 102. For example, in some embodiments, structure 106 may be a mountain range, a building, a sign, an environment surrounding a street, or any other type of structure. In some embodiments, a captured point cloud, such as captured point cloud 110, may include spatial and attribute information for the points included in the point cloud. For example, point A of captured point cloud 110 comprises X, Y, Z coordinates and attributes 1, 2, and 3. In some embodiments, attributes of a point may include attributes such as R, G, B color values, a velocity at the point, an acceleration at the point, a reflectance of the structure at the point, a time stamp indicating when the point was captured, a string-value indicating a modality when the point was captured, for example "walking", or other attributes. The captured point cloud 110 may be provided to encoder 104, wherein encoder 104 generates a compressed version of the point cloud (compressed point cloud information 112) that is transmitted via network 114 to decoder 116. In some embodiments, a compressed version of the point cloud, such as compressed point cloud information 112, may be included in a common compressed point cloud that also includes compressed spatial information for the points of the point cloud or, in some embodiments, compressed spatial information and compressed attribute information may be communicated as separate files.

In some embodiments, encoder 104 may be integrated with sensor 102. For example, encoder 104 may be implemented in hardware or software included in a sensor device, such as sensor 102. In other embodiments, encoder 104 may be implemented on a separate computing device that is proximate to sensor 102.

Figure 2A:
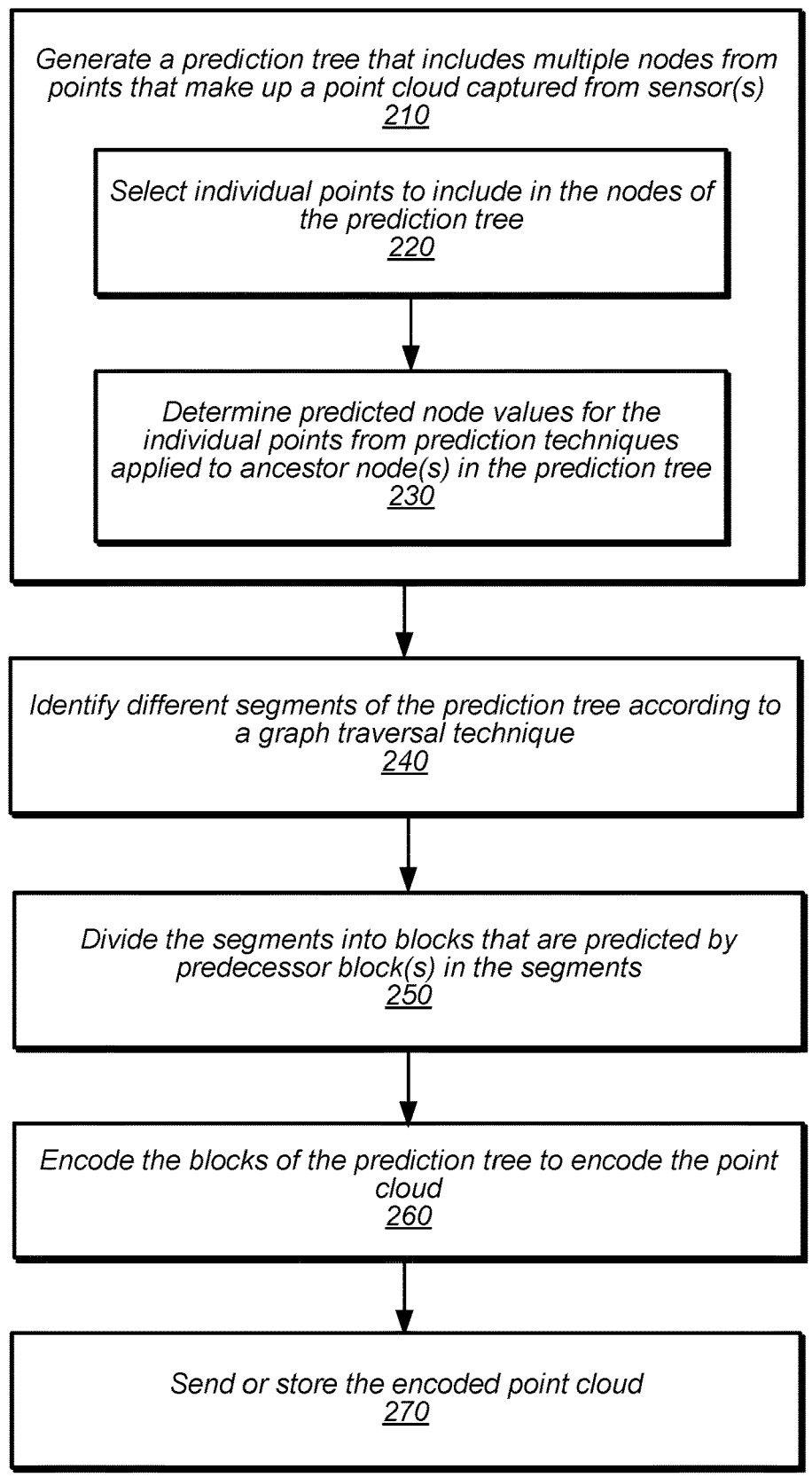
FIG. 2A is a high-level flowchart illustrating various techniques for block-based predictive coding for point clouds, according to some embodiments.

FIG. 2A is a high-level flowchart illustrating various techniques for block-based predictive coding for point clouds, according to some embodiments. As indicated at 210, a prediction tree may be generated that includes multiple nodes from points that make up a point cloud captured from sensor(s), in various embodiments. A prediction tree may serve as a prediction structure, where each point in the point cloud is associated with a node (sometimes referred to as a vertex) of the prediction tree, in some embodiments. In some embodiments, each node may be predicted from only the ancestors of the node in the tree.

Figure 3:
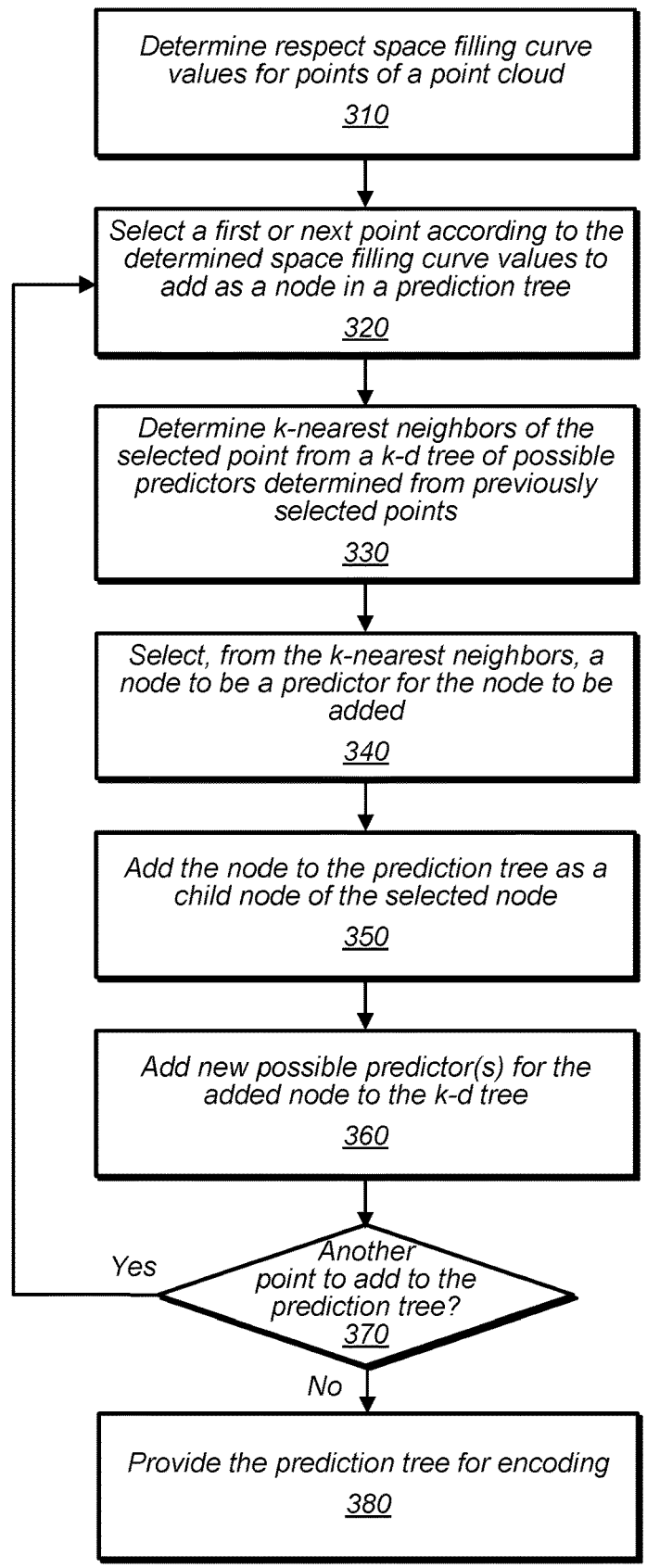
FIG. 3 is a high-level flowchart illustrating various techniques for generating a prediction tree according to a space filling curve, according to some embodiments.
Figure 4:
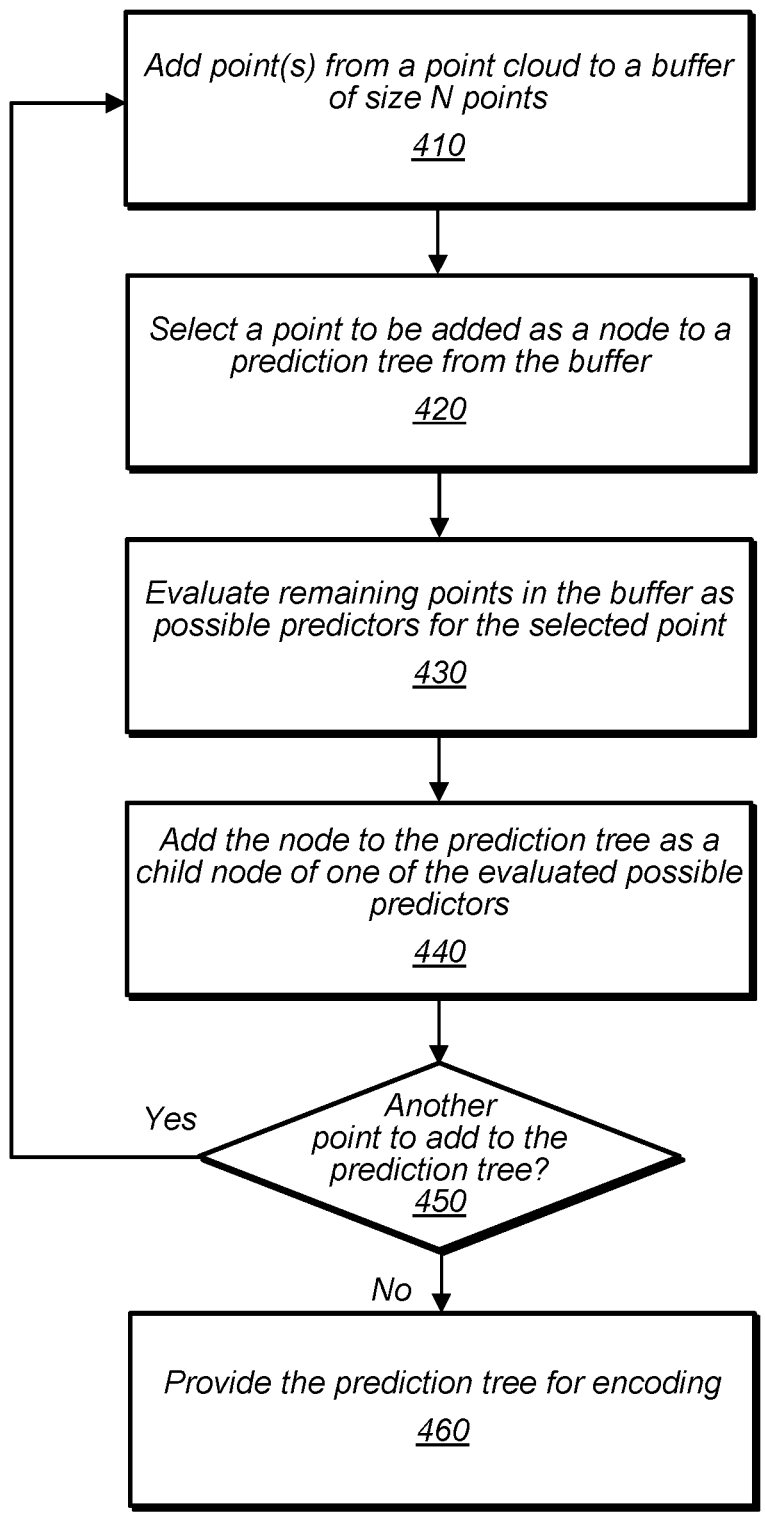
FIG. 4 is a high-level flowchart illustrating various techniques for generating a prediction tree according to a buffer of possible predictors, according to some embodiments.

As part of generating the prediction tree, individual points of the point cloud may be selected for inclusion in the prediction tree, as indicated at 220. As indicated at 230, predicted node values may be determined for the individual points from prediction techniques applied to ancestor nodes in the prediction tree, in some embodiments. FIGS. 3 and 4, discussed below, provide examples prediction tree generation techniques.

Various prediction techniques may be implemented to predict a node from ancestor nodes. These prediction techniques may be signaled as prediction modes or prediction indicators (e.g., mapped to prediction mode values "0"=prediction technique A, "1"=prediction technique B, and so on). In some embodiments, a node in the prediction tree (corresponding to one point in the point cloud) may not have a prediction technique as it may be the first or root node of the prediction tree. The prediction mode for such a node may be indicated as "none" or "root" in some embodiments. The actual information (e.g., spatial information and/or attribute information) for such a node may be encoded instead of the residual information encoded for other nodes in the tree that is used to derive the actual information when applied to predicted values.

Figure 2B:
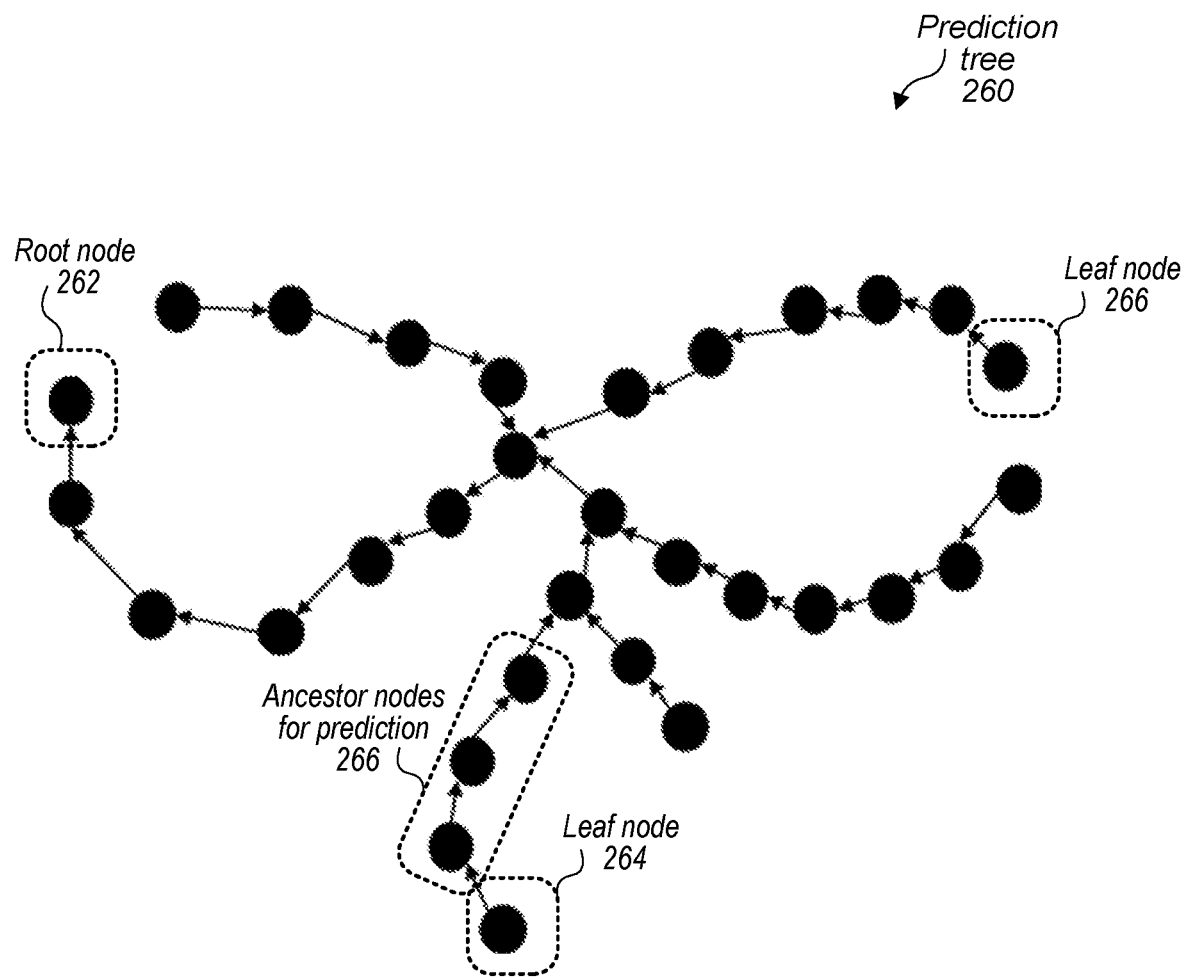
FIG. 2B is an example prediction tree, according to some embodiments.

As illustrated in FIG. 2B, prediction tree 260 may include various nodes that are predicted according to a prediction technique applied to one or more ancestor nodes, indicated by the arrows. For example, leaf node 264 may be predicted by ancestor nodes 266, according to various ones of the prediction techniques discussed below. Some nodes, like root node 262, may not be predicted but encoded as part of prediction tree 260 using the actual values. Other nodes, like leaf node 266, may be predicted according to a single ancestor node.

In some embodiments, delta prediction may be implemented or supported as a prediction technique. Delta prediction may use a position of a parent node of a current node as a predictor of the current node.

In some embodiments, linear prediction may be implemented or supported as a prediction technique. For example, in linear prediction, a point "p0" may be the position of a parent node and "p1" may be the position of a grandparent node. The position of a current node may be predicted as (2×p0−p1).

In some embodiments, parallelogram prediction may be implemented or supported as a prediction technique. For example, in parallelogram prediction "p0" may be the position of the parent node, "p1" the position of the grandparent node, and "p2" be the position of the great-grandparent node. A current node's position may then be determined as (p0+p1−p2).

In some embodiments, rectangular prediction may be implemented or supported as a prediction technique. For example, in rectangular prediction "p0" may be the position of the parent node, "p1" the position of the grandparent node, and "p2" be the position of the great-grandparent node. A current node's position may then be determined as (p0+p2−p1).

In some embodiments, polar prediction may be implemented or supported as a prediction technique. For example, in polar prediction $(\theta_0, r_0, z_0)$ may be the polar coordinates of the parent node and $(\theta_1, r_1, z_1)$ may be the polar coordinates of the grandparent node. The position of the current node is predicted as $$\left(2\theta_0 - \theta_1, \frac{r_0 + r_1}{2}, \frac{z_0 + z_1}{2}\right).$$

In some embodiments, modified polar prediction may be implemented or supported as a prediction technique. For example, in modified polar prediction $(\theta_0, r_0, z_0)$ may be the polar coordinates of the parent node and $(\theta_1, r_1, z_1)$ be the polar coordinates of the grandparent node. The position of the current node may be predicted as $(2\theta_0-\theta_1, r_0, z_0)$.

In some embodiments, average prediction may be implemented or supported as a prediction technique. For example, in average prediction "p0" may be the position of the parent node and "p1" the position of the grandparent node. The position of the current node may be predicted as ((p0+p1)/2).

In some embodiments, average prediction of order 3 may be implemented or supported as a prediction technique. For example, in average prediction of order 3, "p0" may be the position of the parent node, "p1" may be the position of the grandparent node and "p2" may be the position of the great-grandparent node. The position of the current node may be predicted as ((p0+p1+p2)/3).

In some embodiments, average prediction of order k may be implemented or supported as a prediction technique. For example, in average prediction of order k, the positions of ancestor nodes of the current node may be averaged up to the order k ancestor nodes.

The choice of the prediction technique to be applied for each node of the prediction tree may be determined according to a rate-distortion optimization procedure, in some embodiments. In some embodiments, the choice may be adaptive per node or per group of nodes. In some embodiments, the choice may be signaled explicitly in the bitstream or may be implicitly derived based on the location of the node if the prediction graph and decoded positions and prediction modes of the node ancestors. In some embodiments, the choice may be signaled at a block-level for a set of nodes included in a block of a segment of the prediction tree.

The prediction tree may be encoded, including the prediction techniques applied to determine the predicted node values. For example, a node may be encoded along with a number of child nodes, and respective prediction modes to determine each child node (which may be the same for each child, different for each child, or independently determined for each child (even if determined to be the same) in some embodiments). In various embodiments, the prediction tree may be encoded by traversing the tree in a predefined order (e.g., depth first, breath first) and encoding for each node the number of its children. The positions of the nodes may be encoded by encoding first the chosen prediction mode and then the obtained residuals after prediction, in some embodiments. In various embodiments, the number of children and the prediction mode for nodes can be encoded.

In various embodiments, the prediction residuals could be encoded (e.g., arithmetically encoded) in order to further exploit statistical correlations. The residuals could be encoded by compressing the sign of each residue, the position of the most significant bit (equivalent to Floor(Log 2(Abs (residue)))) and the binary representation of the remaining bits, in some embodiments. Correlations between the X, Y, Z coordinates could be exploited by using a different entropy/arithmetic context based on the encoded values of the first encoded components, in some embodiments.

Figure 2C:
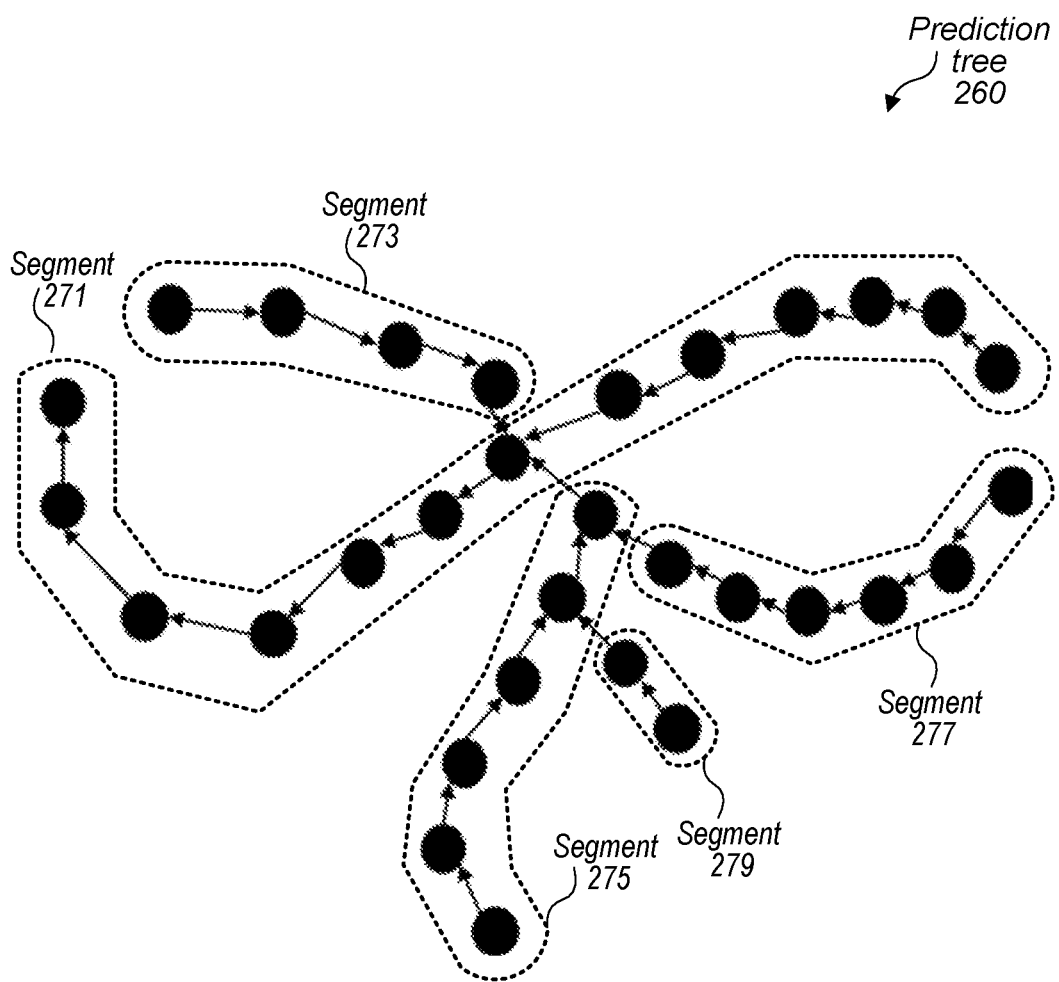
FIG. 2C is an example of identified segments of a prediction tree, according to some embodiments.

Block-based predictive coding techniques may be implemented for encoding residuals, in various embodiments. For example, as indicated at 240, different segments of the prediction tree may be identified according to a graph traversal technique, in some embodiments. For example, a traversal technique may start with a root node (e.g., root node 262 in FIG. 2) and traverse the nodes until a leaf node is reached. This first path may be a first segment. For example, as illustrated in FIG. 2C, segment 271 may include root node 262 and may traverse a path until a leaf node, like leaf node 266, is reached. A next node in a traversal order according to a traversal technique may be selected to identify another segment that ends with another leaf node. For instance, segment 273 may be identified. Some techniques may be iteratively performed until each node of a prediction tree is identified in a segment. In FIG. 2C, for example, segments 275, 277, and 279, may also be identified which together with segments 271 and 273 may divide prediction tree into different segments that together include all of the nodes of prediction tree 260. Although the example traversal technique discussed above may be used to identify segments, in some embodiments, many traversal techniques could be applied in various embodiments (e.g., depth first search, breadth first search, and so on).

Figure 2D:
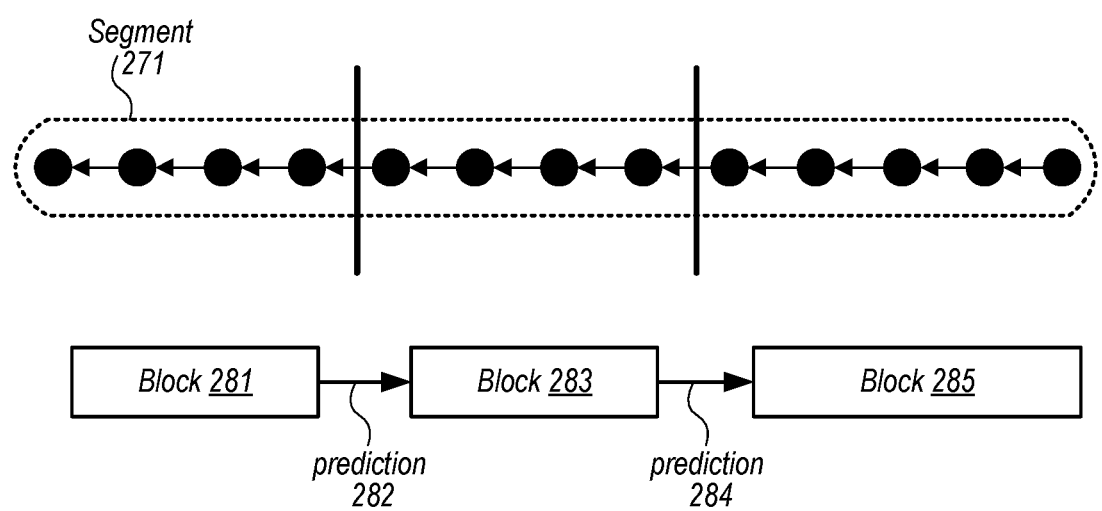
FIG. 2D is an example of a segment of a prediction tree divided into blocks, according to some embodiments.

As indicated at 250, the segments of the prediction tree may be divided into blocks that are predicted by prior block(s) in the segments, in various embodiments. For example, a segment may be divided into blocks of various sizes (e.g., 4 nodes, 16 nodes, 32 nodes, 64 nodes, 128 nodes, and so on). In some embodiments, block size could be determined based on Rate Distortion Optimization (RDO) in order to minimize the reconstruction errors under a predefined budget of bits. FIG. 2D illustrates an example of dividing a segment into blocks. Segment 271 may be divided into blocks 281, 283, and 285 including or representing the corresponding nodes of the divided segment.

In various embodiments, one (or more) blocks may predict another block by considering the geometry or other shape information and/or attribute values of predecessor block(s) in the segment. For instance, as illustrated in FIG. 2C, block 281 may be used to determine a prediction 282 for block 283, which may in turn be used to generate a prediction 284 for block 285 (which may also be predicted based on block 281, in some scenarios).

Similar to the prediction techniques between nodes in the prediction graph discussed above, different prediction techniques between blocks may be used, which may be referred to or signaled as block prediction modes, in some embodiments. For example, multiple prediction techniques may be potentially applied for blocks and an RDO technique may be implemented to select one to apply between them. In some embodiments, the block-prediction mode for a block may be explicitly identified in an encoding of a block (e.g., by signaling a block prediction mode value. In other embodiments, a block prediction mode may be implicit in a prediction tree and may be derived or otherwise determined according to modes of previous blocks and the position of the block in the prediction tree.

In some embodiments, a block prediction mode may include an averaging technique. For example, the spatial information and/or attribute values of a block may be predicted by the average spatial information (e.g., geometry) and/or attribute values of the points of a predecessor block, which may be the immediately adjacent block identified according to an edge that connects a node in each of the blocks, such as block 281 and block 283 illustrated in FIG. 2C.

In some embodiments, a block prediction mode may be based on an individual node. For example, a prediction may be performed using the spatial information and/or attribute values of a parent node of the first node in the block, in one embodiment. For example, if node D is in block 281 and is a parent of node F in block 283 (which may be the first node in block 283), then the spatial information and/or attribute values of node D may be used to predict block 283.

In some embodiments, a block prediction mode may be based on various extrapolation techniques. For example, extrapolation techniques (e.g., linear, polynomial, conic, or others) may be applied to the values of a predecessor block, which may be immediately adjacent, in order to predict the node values in the current block.

In some embodiments, a block prediction mode may be based on a curve fitting technique. For example, an immediately adjacent predecessor block may be used to perform curve fitting techniques. In some embodiments, a decedent block, which may be an immediately adjacent decedent bloc, may be used to perform curve fitting techniques.

Figure 5:
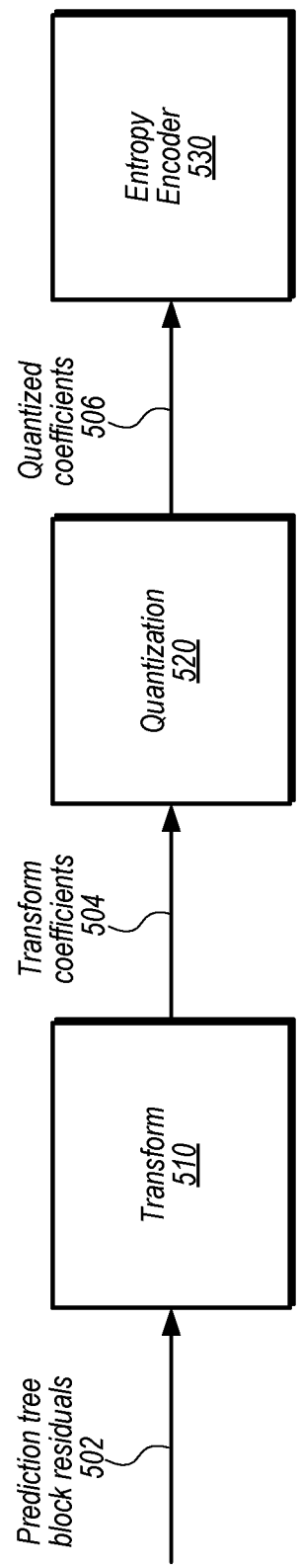
FIG. 5 is high-level flowchart illustrating various techniques for encoding prediction tree blocks, according to some embodiments.

As indicated at 260, the blocks of the prediction tree may be then be encoded to encode the point cloud, according to some embodiments. FIG. 5, discussed below, discusses various example techniques for transforming encoding transformed residuals for blocks of points of a point cloud. As indicated at 270, the encoded prediction tree for the point cloud may be sent or stored, according to the various examples discussed above with regard to FIG. 1 and below with regard to FIGS. 7A, 8 and 9.

FIG. 3 is a high-level flowchart illustrating various techniques for generating a prediction tree according to a space filling curve, according to some embodiments. As indicated at 310, a space filling curve (e.g., a Morton order) may be used to determine values (e.g., Morton codes) for points of a point cloud, in some embodiments. As indicated at 320, a first or next point according to the space filling curve values may be selected to add as a node in a prediction tree, in some embodiments.

As indicated at 330, k-nearest neighbors of the selected point may be determined from a k-dimensional (k-d) tree of possible predictors determined from previously selected points, in some embodiments. As indicated at 340, from the k-nearest neighbors, a node may be selected to a predictor for the node to be added, in some embodiments. For example, the node may be selected according to the magnitude of prediction residuals, the number of children the node has, and/or the frequency of the chosen prediction mode, in some embodiments. As indicated at 350, the child node may be added to the prediction tree as a child node of the selected node, in some embodiments. New possible predictor(s) (e.g., predicted values generated from the prediction techniques discussed above) for the added node may be added to the k-d tree, as indicated at 360, in some embodiments. As indicated at 380, if another point remains to be added to the prediction tree, then the features of the technique may be repeated. When all points are added, the prediction tree may be provided for encoding, as indicated at 380.

In some embodiments, the points may be decomposed into various levels of detail (LODs) before performing the techniques illustrated in FIG. 3. For example, the LODs may be encoded starting from the coarsest LOD to the finest LOD. In such an embodiment, the potential predictors and predicted positions in the k-d tree. In some embodiments, different quantization parameters may be used for a different LOD (e.g., a smaller quantization step for the coarsest LOD) in order to obtain better rate distortion (RD) performance. In some embodiments, functionalities of temporal scalability, spatial scalability, quality scalability, and progressive transmission may be implemented utilizing LODs or other hierarchical prediction structure. In this way, the coarse LOD may be streamed and decoded first, and then progressively more granular LODs may be streamed and decoded adaptively based on network conditions, terminal capabilities, and a distance of the point cloud to a viewer, in some embodiments.

For a lower latency approach (when compared with the techniques of FIG. 3), an encoder may process the input point cloud in the same order it is received, in some embodiments. A limited buffering buffer N may be implemented that is measured in terms of number of buffered points B is allowed (e.g., B=1024 points), in some embodiments. B may be a decoder parameter that could be adjusted depending on the how stringent the application latency requirements are. When looking for the best predictor for each vertex, the encoder would consider only the points that are in the buffer, in some embodiments.

FIG. 4 is a high-level flowchart illustrating various techniques for generating a prediction tree according to a buffer of possible predictors, according to some embodiments. As indicated at 410, point(s) from a point cloud may be added to a buffer of size N points, in some embodiments. As indicated at 420, a point to be added as a node to a prediction tree may be selected, from the buffer, in some embodiments. As indicated at 430, remaining points in the buffer may be evaluated as possible predictors for the selected point. For instance, as discussed above with regard to FIG. 3, the remaining points in the buffer may be evaluated according to the magnitude of prediction residuals, the number of children the corresponding node of the points has, and/or the frequency of the chosen prediction mode, in some embodiments.

As indicated at 440, the node may be added to the prediction tree as a child node of one of the evaluated possible predictors, in some embodiments. If another point remains to be added to the prediction tree, then as indicated by the positive exit from 450, elements 410 through 440 may be added to the prediction tree. When all points have been added to the prediction tree, then the prediction tree may be provided for encoding, in some embodiments.

In some embodiments, the prediction tree could be used to compress or otherwise encode spatial information, such as geometry, or various other attributes (e.g., color information). In some scenarios, the same predictors of different nodes could be used and potentially explicitly encoded in the bitstream for the attributes. The scalability and low-latency properties can be directly be inherited from the prediction tree generation strategy.

In an alternative embodiment, the predictive coding technique may be applied only for the spatial information, while alternative techniques may be used for encoding attributes (e.g., lifting, Region Adaptive Hierarchical Transform (RAHT) or prediction scheme for the attributes according to the G-PCC attributes encoding scheme). In order to enable low latency application, the Morton re-ordering of the points that would be otherwise applied before the attributes coding would be disabled, in some embodiments.

In some embodiments, hierarchical prediction and lifting schemes (e.g., as defined in G-PCC (Geometry-based point cloud compression standards adopted by MPEG or other entities) could be modified to exploit the prediction scheme to guide the decimation and nearest neighbor's detection processes. For example, the decimation process could be applied by using edge collapse operators or any other topological decimation operator.

The criteria to choose the edge-collapse operation or other topological decimation operations to be applied to generate LODs could be guided by distance criteria (e.g., distance between the merged points) and/or explicit information included by the encoder in the bitstream, in some embodiments. The nearest neighbor search could be restricted to the neighbors in the tree structure or could use the prediction tree structure to accelerate it, in some embodiments.

FIG. 5 is a logical block diagram of encoding blocks of a prediction tree, according to some embodiments. As indicated at 502, block residuals of a prediction tree may be transformed, as indicated at 510. The residuals 502 may be the residuals for the spatial information and/or attributes of the points of the blocks. Transform 510 may apply various transformation techniques to residuals 502, in some embodiments. In some embodiments, transformation techniques applied to spatial information residuals may utilize the prediction tree structure. In some embodiments, transformation techniques for attributes of the points of the blocks may utilize both the prediction tree structure and reconstructed spatial information (e.g. the geometry information of the point cloud). In some embodiments, the geometry information provided to an encoder may be utilized without necessarily requiring a reconstruction.

Similar to block-based prediction techniques, multiple transformation techniques may be implemented, in some embodiments, which may be referred to as block residual transformation modes. In some embodiments, an RDO technique may be implemented to select one to apply. In some embodiments, the block residual transformation mode for a residuals of a block may be explicitly identified in an encoding of a block (e.g., by signaling a block residual transformation mode value). In other embodiments, a block residual transformation mode may be implicit in a prediction tree and may be derived or otherwise determined according to modes of previous blocks and the position of the block in the prediction tree. Some examples of transformation techniques that may be implemented in some embodiments include, but are not limited to, One Dimensional (1D) Discrete Cosine Transform (DCT), wavelet transform, Discrete Wavelet Transform (DWT), Haar transforms, Hadamard transform, graph transforms, lifting schemes defined on top of a local graph structure, and transforms used in codecs such as High Efficiency Video Coding (HEVC) and/or Versatile Video Coding (VVC) that are applied to 1D signals, in some embodiments.

As indicated at 504, the coefficients 504 generated as a result of transform 510 applied to prediction tree block residuals 502 may be provided to a quantization stage, as indicated 520, in various embodiments. For example, quantization 520 may provide a uniform quantization technique to coefficients, in some embodiments, and in other embodiments, may apply a non-uniform quantization technique. In at least some embodiments, a quantization coefficient may be pre-scaled to compensate for unitary transforms applied at 510. In some embodiments, an integer version of the transformed coefficients may be considered or evaluated, which may achieve a more robust result and allow for perfect reconstruction and lossless/near-loss encoding.

In some embodiments, quantization parameters used at quantization 520 may be varied per prediction tree block. For example, quantization parameters could be varied for rate control purposes or to adaptively adjust the reconstruction quality based on other criteria (e.g., Region of Interest (ROI), view-dependent coding, and so on). In some embodiments, the quantization parameters and/or transform selected for a block may be signaled to a decoder at a block-level. For example, a decoder may apply an inverse quantization and/or inverse transform. The decoder may select/modify the inverse quantization based on quantization parameters signaled for a block in the bit stream. Likewise, the decoder may select/modify an inverse quantization function to be applied to the coefficients for a block based on information in the bit stream indicating a transform applied to the residuals for the block at the encoder. In some embodiments, an encoder and a decoder may follow a similar transformation and/or quantization scheme such that transforms and quantization parameters may be implied.

Quantization techniques applied at quantization 520 may depend upon a transformation technique applied to a block, in some embodiments. For example, different quantization techniques could vary the reconstruction quality achieved in different scenarios. For instance, a quantization technique could be used for lossless coding, providing a perfect reconstruction of the spatial information and/or attribute values. A quantization technique could be used for near-lossless coding, providing a maximum reconstruction error that is guaranteed for spatial information and/or attribute values. A quantization technique could be used for lossy coding, providing a maximum reconstruction error that is guaranteed for the average spatial information and/or attribute values.

As indicated at 506, the quantized coefficients may be entropy encoded at entropy encoder 530, in some embodiments, as part of encoding the point cloud.

Figure 6:
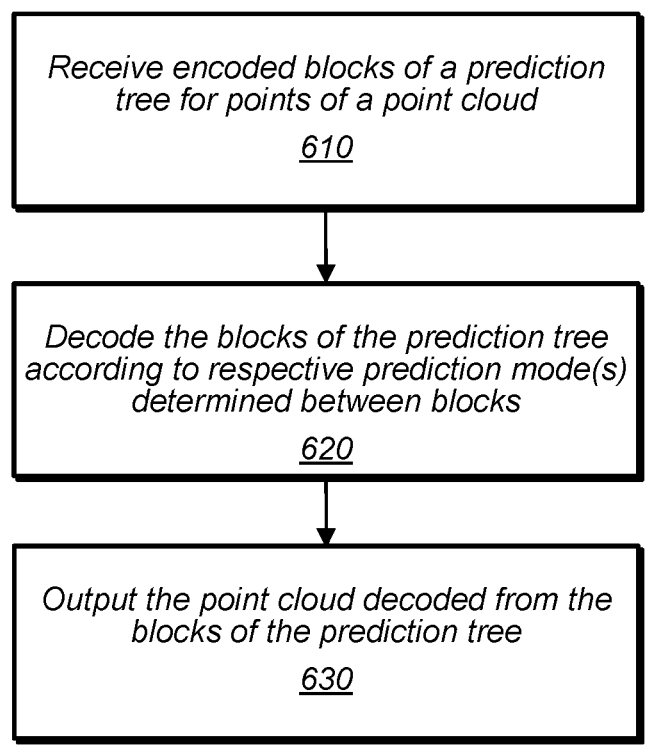
FIG. 6 is a high-level flowchart illustrating various techniques for decoding prediction tree blocks for a point cloud, according to some embodiments.

FIG. 6 is a high-level flowchart illustrating various techniques for decoding prediction tree blocks for a point cloud, according to some embodiments. As indicated at 610 encoded blocks of a prediction tree for points of a point cloud may be received, in some embodiments. As indicated at 620, the encoded blocks of the prediction tree for the points of the point cloud may be decoded. For example, techniques to undo entropy or other encoding techniques may be performed.

In at least some embodiments, the encoded prediction tree may include enough information to generate the points of the point cloud from the blocks of the prediction tree (e.g., without performing the same tree generation techniques discussed above with regard to FIGS. 3 and 4). For example, a selected block (e.g. a block containing a root node) may be decoded as a first block containing a first point in the point cloud. Then, the nodes within the selected block may be decoded according to prediction modes included between the nodes in the block, in some embodiments. Then, a prediction mode for a next block may be used to decode a next block of the prediction tree, so that the nodes within the next block may be decoded. This technique may repeat until the nodes of each of the blocks are decoded to determine the point cloud. Once complete the decoded point cloud from the prediction tree may be output, as indicated at 660 (e.g., for further processing, display, and/or storage).

Figure 7:
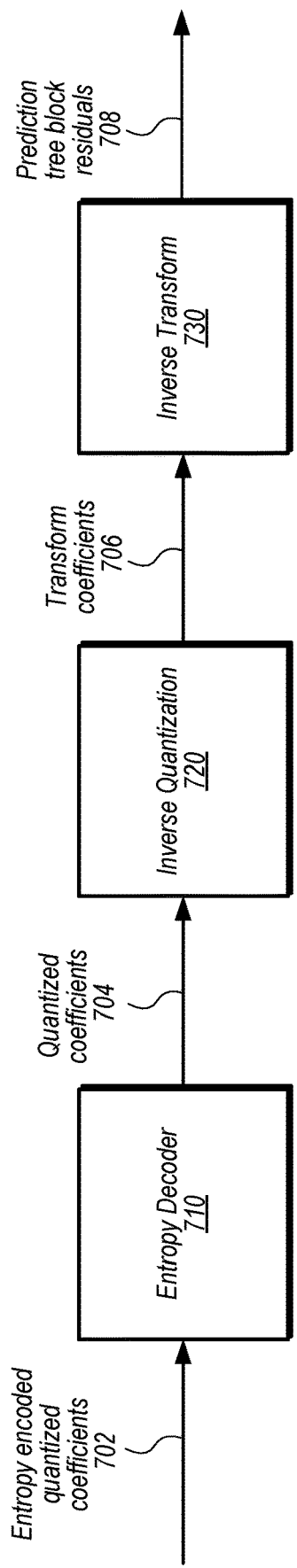
FIG. 7 is high-level flowchart illustrating various techniques for decoding prediction tree blocks, according to some embodiments.

In some embodiments, wherein a transform has been applied to the residual values of the block and or a quantization operation, an inverse transformation and/or an inverse quantization may be applied as part of decoding a block. For example, FIG. 7 illustrates high-level flowchart illustrating various techniques for decoding prediction tree blocks, according to some embodiments.

In some embodiments, a decoder may receive entropy encoded quantized coefficients for a block, such as may have been generated as an output of block 530 of FIG. 5. In some embodiments, the bitstream may indicate quantization parameters and/or a transform that was applied to the residual values of the block to generate the quantized coefficients.

At block 710, the decoder entropy decodes the entropy encoded quantized coefficients 702 to recreate the quantized coefficients 704. At block 720, the decoder may then apply an inverse quantization operation, based on information known about the quantization applied at the encoder, to recreate transform coefficients 706. Additionally, at block 730 the decoder may apply an inverse transform function to the transform coefficients 706 to generate prediction tree block residuals 708. The prediction tree block residuals may then be used to correct/adjust node values predicted for nodes of the block.

As can be seen, the entropy decoder 710, the inverse quantization 720, and the inverse transform 730 may reverse the entropy encoding performed at 530 of FIG. 5 along with the quantization performed at 520 and the transformation function applied at 510. This may result in recreating the prediction tree block residuals 502 at a decoder, or a lossy reconstructed version of the prediction tree block residuals 502.

Figure 8A:
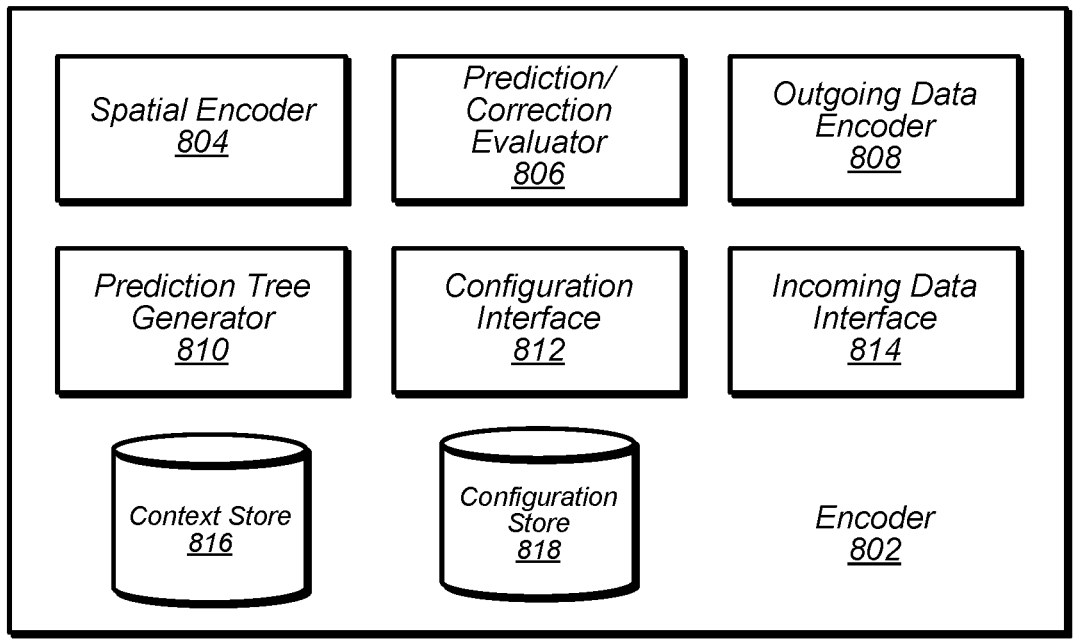
FIG. 8A illustrates components of an encoder, according to some embodiments.

FIG. 8A illustrates components of an encoder, according to some embodiments. Encoder 802 may be a similar encoder as encoder 104 illustrated in FIG. 1A. Encoder 802 includes spatial encoder 804, octree tree generator 810, prediction/correction evaluator 806, incoming data interface 814, and outgoing data interface 808. Encoder 802 also includes context store 816 and configuration store 818.

In some embodiments, a spatial encoder, such as spatial encoder 804, may compress spatial information associated with points of a point cloud, such that the spatial information can be stored or transmitted in a compressed format. In some embodiments, a spatial encoder, such as spatial encoder 804, may utilize octrees to compress spatial information for points of a point cloud as discussed in more detail herein.

In some embodiments, compressed spatial information may be stored or transmitted with compressed attribute information or may be stored or transmitted separately. In either case, a decoder receiving compressed attribute information for points of a point cloud may also receive compressed spatial information for the points of the point cloud, or may otherwise obtain the spatial information for the points of the point cloud.

A prediction tree generator, such as prediction tree generator 810, may implement various techniques discussed above to generate a prediction tree to be encoded.

A prediction/correction evaluator, such as prediction/correction evaluator 806 of encoder 802, may determine predicted attribute values for points of a point cloud based on an inverse distance interpolation method using attribute values of the K-nearest neighboring points of a point for whom an attribute value is being predicted. The prediction/correction evaluator may also compare a predicted attribute value of a point being evaluated to an original attribute value of the point in a non-compressed point cloud to determine an attribute correction value. In some embodiments, a prediction/correction evaluator, such as prediction/correction evaluator 806 of encoder, 802 may adaptively adjust a prediction strategy used to predict attribute values of points in a given neighborhood of points based on a measurement of the variability of the attribute values of the points in the neighborhood.

An outgoing data encoder, such as outgoing data encoder 808 of encoder 802, may encode attribute correction values and assigned attribute values included in a compressed attribute information file for a point cloud. In some embodiments, an outgoing data encoder, such as outgoing data encoder 808, may select an encoding context for encoding a value, such as an assigned attribute value or an attribute correction value, based on a number of symbols included in the value. In some embodiments, values with more symbols may be encoded using an encoding context comprising Golomb exponential encoding, whereas values with fewer symbols may be encoded using arithmetic encoding. In some embodiments, encoding contexts may include more than one encoding technique. For example, a portion of a value may be encoded using arithmetic encoding while another portion of the value may be encoded using Golomb exponential encoding. In some embodiments, an encoder, such as encoder 802, may include a context store, such as context store 816, that stores encoding contexts used by an outgoing data encoder, such as outgoing data encoder 808, to encode attribute correction values and assigned attribute values.

In some embodiments, an encoder, such as encoder 802, may also include an incoming data interface, such as incoming data interface 814. In some embodiments, an encoder may receive incoming data from one or more sensors that capture points of a point cloud or that capture attribute information to be associated with points of a point cloud. For example, in some embodiments, an encoder may receive data from an LIDAR system, 3-D-camera, 3-D scanner, etc. and may also receive data from other sensors, such as a gyroscope, accelerometer, etc. Additionally, an encoder may receive other data such as a current time from a system clock, etc. In some embodiments, such different types of data may be received by an encoder via an incoming data interface, such as incoming data interface 814 of encoder 802.

In some embodiments, an encoder, such as encoder 802, may further include a configuration interface, such as configuration interface 812, wherein one or more parameters used by the encoder to compress a point cloud may be adjusted via the configuration interface. In some embodiments, a configuration interface, such as configuration interface 812, may be a programmatic interface, such as an API. Configurations used by an encoder, such as encoder 802, may be stored in a configuration store, such as configuration store 818.

In some embodiments, an encoder, such as encoder 802, may include more or fewer components than shown in FIG. 8A.

Figure 8B:
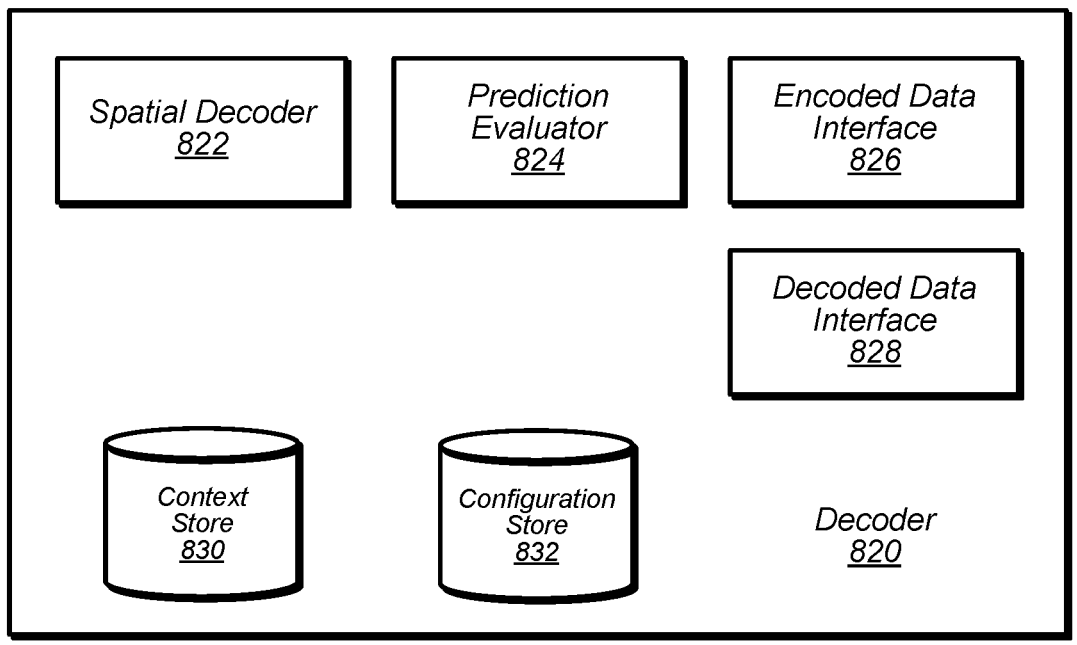
FIG. 8B illustrates components of a decoder, according to some embodiments.

FIG. 8B illustrates components of a decoder, according to some embodiments.

Decoder 820 may be a similar decoder as decoder 116 illustrated in FIG. 1A. Decoder 820 includes encoded data interface 826, spatial decoder 822, prediction evaluator 824, context store 830, configuration store 832, and decoded data interface 828.

A decoder, such as decoder 820, may receive an encoded compressed point cloud and/or an encoded compressed attribute information file for points of a point cloud. For example, a decoder, such as decoder 820, may receive a compressed attribute information file and/or a compressed spatial information file. The compressed attribute information file and/or compressed spatial information file may be received by a decoder via an encoded data interface, such as encoded data interface 826. The encoded compressed point cloud may be used by the decoder to determine spatial information for points of the point cloud. For example, spatial information of points of a point cloud included in a compressed point cloud may be generated by a spatial decoder, such as spatial decoder 822. In some embodiments, a compressed point cloud may be received via an encoded data interface, such as encoded data interface 826, from a storage device or other intermediary source, wherein the compressed point cloud was previously encoded by an encoder, such as encoder 104. In some embodiments, an encoded data interface, such as encoded data interface 826, may decode spatial information. For example the spatial information may have been encoded using various encoding techniques as described herein, such as the various techniques for encoding geometry or other spatial information and/or attribute information as a prediction tree.

A prediction evaluator of a decoder, such as prediction evaluator 824, may select a starting point of a minimum spanning tree based on an assigned starting point included in a compressed attribute information file. In some embodiments, the compressed attribute information file may include one or more assigned values for one or more corresponding attributes of the starting point. In some embodiments, a prediction evaluator, such as prediction evaluator 824, may assign values to one or more attributes of a starting point in a decompressed model of a point cloud being decompressed based on assigned values for the starting point included in a compressed attribute information file. A prediction evaluator, such as prediction evaluator 824, may further utilize the assigned values of the attributes of the starting point to determine attribute values of neighboring points. For example, a prediction evaluator may select a next nearest neighboring point to the starting point as a next point to evaluate, wherein the next nearest neighboring point is selected based on a shortest distance to a neighboring point from the starting point in the minimum spanning tree. Note that because the minimum spanning tree is generated based on the same or similar spatial information at the decoder as was used to generate a minimum spanning tree at an encoder, the decoder may determine the same evaluation order for evaluating the points of the point cloud being decompressed as was determined at the encoder by identifying next nearest neighbors in the minimum spanning tree.

A decoder, such as decoder 820, may provide a decompressed point cloud generated based on a received compressed point cloud and/or a received compressed attribute information file to a receiving device or application via a decoded data interface, such as decoded data interface 828. The decompressed point cloud may include the points of the point cloud and attribute values for attributes of the points of the point cloud. In some embodiments, a decoder may decode some attribute values for attributes of a point cloud without decoding other attribute values for other attributes of a point cloud. For example, a point cloud may include color attributes for points of the point cloud and may also include other attributes for the points of the point cloud, such as velocity, for example. In such a situation, a decoder may decode one or more attributes of the points of the point cloud, such as the velocity attribute, without decoding other attributes of the points of the point cloud, such as the color attributes.

In some embodiments, the decompressed point cloud and/or decompressed attribute information file may be used to generate a visual display, such as for a head mounted display. Also, in some embodiments, the decompressed point cloud and/or decompressed attribute information file may be provided to a decision making engine that uses the decompressed point cloud and/or decompressed attribute information file to make one or more control decisions. In some embodiments, the decompressed point cloud and/or decompressed attribute information file may be used in various other applications or for various other purposes.

Example Applications for Point Cloud Compression and Decompression

Figure 9:
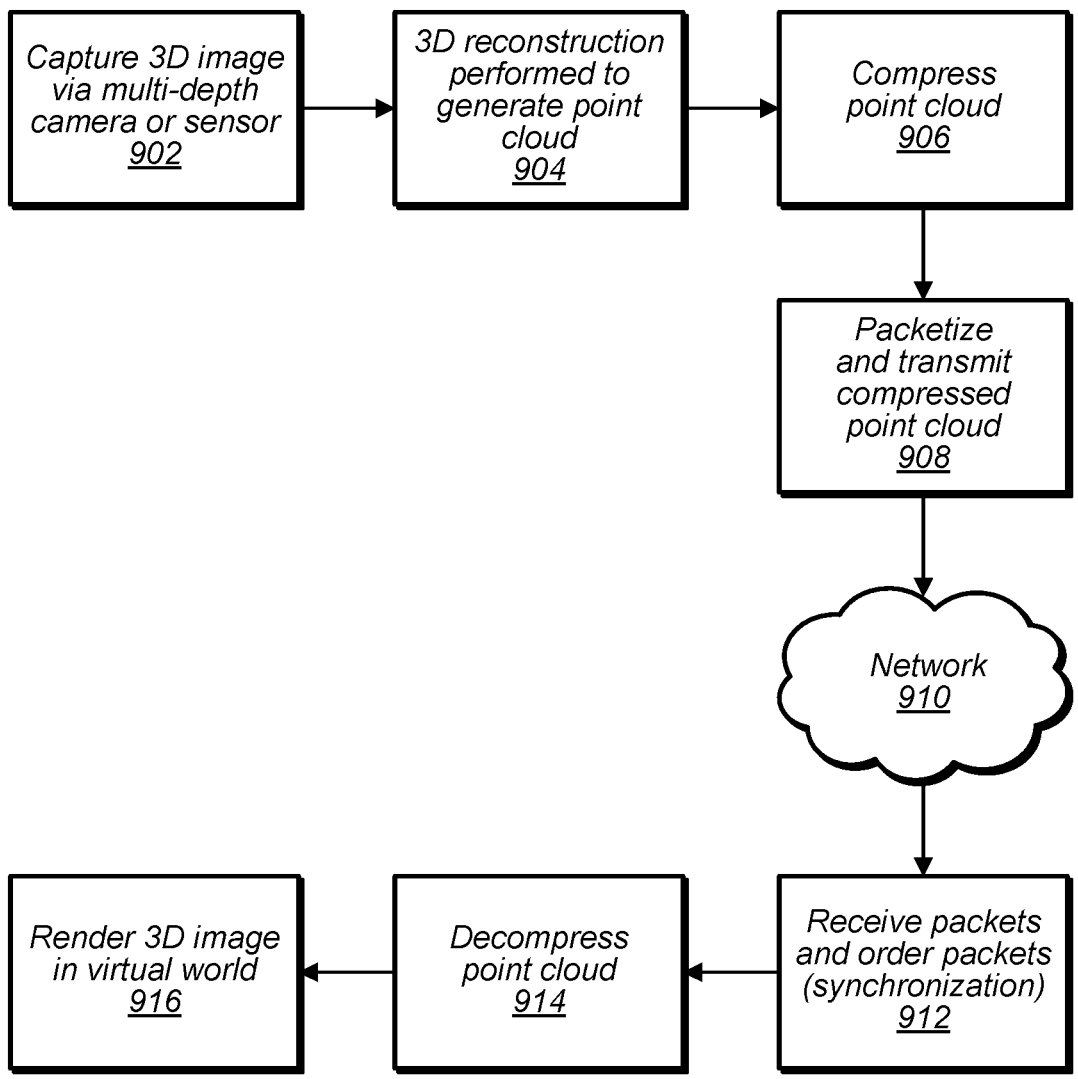
FIG. 9 illustrates compressed point cloud information being used in a 3-D application, according to some embodiments.

FIG. 9 illustrates compressed point clouds being used in a 3-D application, according to some embodiments.

In some embodiments, a sensor, such as sensor 102, an encoder, such as encoder 104, and a decoder, such as decoder 116, may be used to communicate point clouds in a 3-D application. For example, a sensor, such as sensor 102, at 902 may capture a 3D image and at 904, the sensor or a processor associated with the sensor may perform a 3D reconstruction based on sensed data to generate a point cloud.

At 906, an encoder such as encoder 104 may compress the point cloud and at 908 the encoder or a post processor may packetize and transmit the compressed point cloud, via a network 910. At 912, the packets may be received at a destination location that includes a decoder, such as decoder 116. The decoder may decompress the point cloud at 914 and the decompressed point cloud may be rendered at 916. In some embodiments a 3-D application may transmit point cloud data in real time such that a display at 916 represents images being observed at 902. For example, a camera in a canyon may allow a remote user to experience walking through a virtual canyon at 916.

Figure 10:
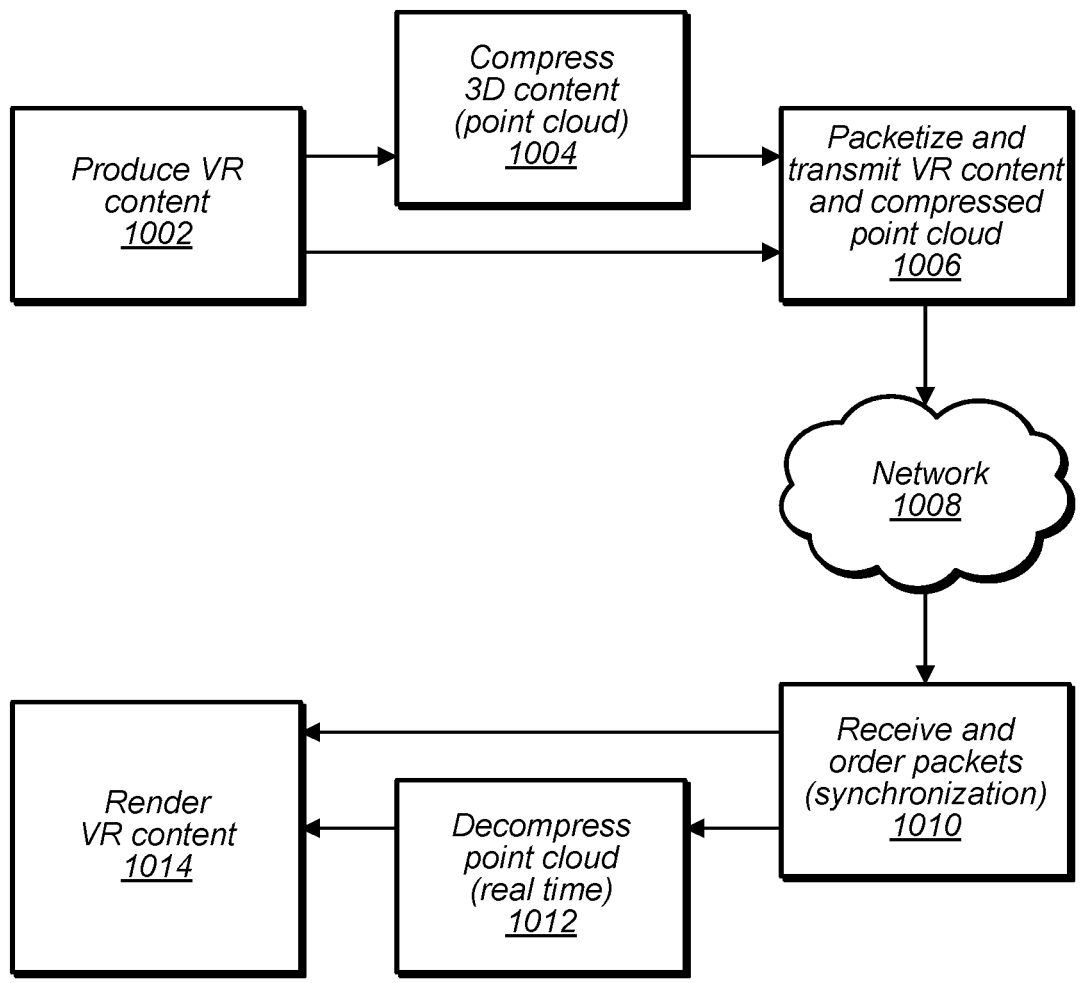
FIG. 10 illustrates compressed point cloud information being used in a virtual reality application, according to some embodiments.

FIG. 10 illustrates compressed point clouds being used in a virtual reality (VR) or augmented reality (AR) application, according to some embodiments.

In some embodiments, point clouds may be generated in software (for example as opposed to being captured by a sensor). For example, at 1002 virtual reality or augmented reality content is produced. The virtual reality or augmented reality content may include point cloud data and non-point cloud data. For example, a non-point cloud character may traverse a landscape represented by point clouds, as one example. At 1004, the point cloud data may be compressed and at 1006 the compressed point cloud data and non-point cloud data may be packetized and transmitted via a network 908. For example, the virtual reality or augmented reality content produced at 1002 may be produced at a remote server and communicated to a VR or AR content consumer via network 1008. At 1010, the packets may be received and synchronized at the VR or AR consumer's device. A decoder operating at the VR or AR consumer's device may decompress the compressed point cloud at 1012 and the point cloud and non-point cloud data may be rendered in real time, for example in a head mounted display of the VR or AR consumer's device. In some embodiments, point cloud data may be generated, compressed, decompressed, and rendered responsive to the VR or AR consumer manipulating the head mounted display to look in different directions.

In some embodiments, point cloud compression as described herein may be used in various other applications, such as geographic information systems, sports replay broadcasting, museum displays, autonomous navigation, etc.

Example Computer System

Figure 11:
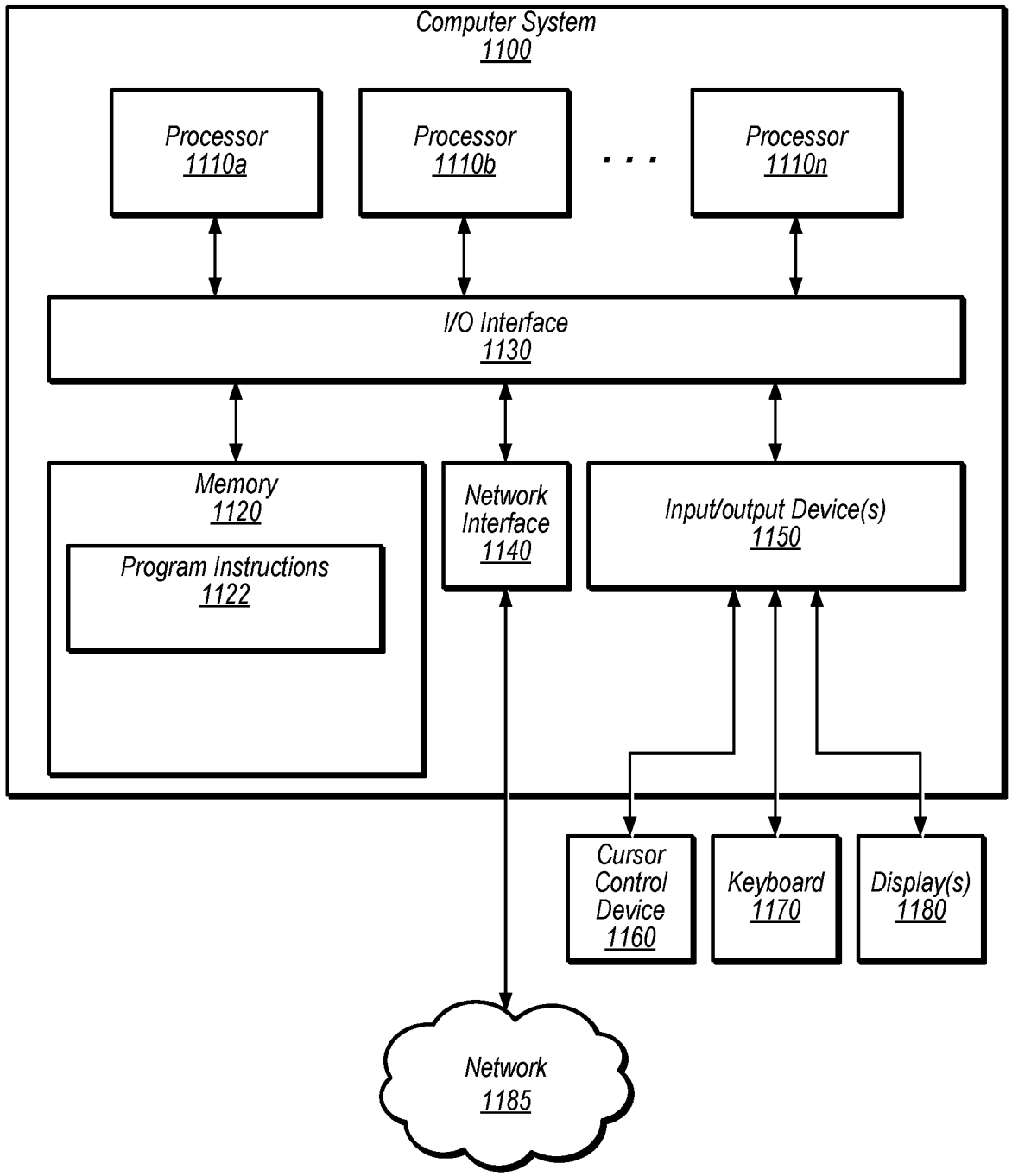
FIG. 11 illustrates an example computer system that may implement an encoder or decoder, according to some embodiments.

FIG. 11 illustrates an example computer system 1100 that may implement an encoder or decoder or any other ones of the components described herein, (e.g., any of the components described above with reference to FIGS. 1-10), in accordance with some embodiments. The computer system 1100 may be configured to execute any or all of the embodiments described above. In different embodiments, computer system 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 1100, which may interact with various other devices. Note that any component, action, or functionality described above with respect to FIGS. 1-10 may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store point cloud compression or point cloud decompression program instructions 1122 and/or sensor data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions 1122 may be configured to implement an image sensor control application incorporating any of the functionality described above. In some embodiments, program instructions and/or data may be received, sent or stored upon different types of computer-accessible media or on similar media separate from system memory 1120 or computer system 1100. While computer system 1100 is described as implementing the functionality of functional blocks of previous Figures, any of the functionality described herein may be implemented via such a computer system.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1122, which may be processor-executable to implement any element or action described above. In one embodiment, the program instructions may implement the methods described above. In other embodiments, different elements and data may be included. Note that data may include any data or information described above.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. One or more non-transitory, computer-readable storage media, storing program instructions that when executed on or across one or more computing devices cause the one or more computing devices to:
    compress geometric information for a point cloud, wherein to compress the geometric information, the program instructions cause the one or more computing devices to:
        generate a prediction tree comprising a plurality of nodes, wherein:
            respective ones of the nodes correspond to respective points in a one-to-one relationship, wherein the respective points make up the point cloud,
            the respective ones of the points comprise spatial location information for the respective point,
            geometric prediction using a parent, grand-parent, or great-grandparent node is used to determine the respective nodes of the prediction tree that correspond to the respective points of the point cloud, and
            spatial locations of the points of the point cloud are represented in a compressed form in the prediction tree via the nodes of the prediction tree;
        identify different segments of the prediction tree according to a graph traversal technique;
        divide the segments into respective blocks, wherein spatial location node values of nodes included in the respective blocks are predicted based on spatial location node values of nodes included in one or more predecessor blocks in the segment; and
        encode the blocks of the prediction tree to encode the geometric information for the point cloud; and
    send or store the encoded blocks for the point cloud.

2. The one or more non-transitory, computer-readable storage media of claim 1, wherein, to encode the blocks of the prediction tree, the program instructions cause the one or more computing devices to further:
    apply a transform to residual values of the blocks of the prediction tree; and
    apply quantization to coefficients generated from the transformed residual values of the blocks of the prediction tree.

3. The one or more non-transitory, computer-readable storage media of claim 1, wherein, to identify different segments of the prediction tree according to the graph traversal technique, the program instructions cause the one or more computing devices to:
    traverse nodes of the prediction tree from a root node of the prediction tree to a first leaf node of the prediction tree to identify a first segment of the segments; and
    iteratively traverse other nodes of the prediction tree from next nodes identified according to the graph traversal technique to other leaf nodes until remaining nodes in the prediction tree are included in another one of the segments.

4. The one or more non-transitory, computer-readable storage media of claim 1, wherein a respective prediction technique for predicting spatial location node values of one of the blocks is different than a respective prediction technique for predicting spatial location node values of another one of the blocks.

5. The one or more non-transitory, computer-readable storage media of claim 1, wherein respective prediction techniques to be used to predict spatial location node values for the nodes of the prediction tree are signaled at a block level.

6. The one or more non-transitory, computer-readable storage media of claim 1, wherein different prediction techniques are signaled for different nodes included in a same block.

7. The one or more non-transitory, computer-readable storage media of claim 6, wherein the program instructions cause the one or more computing devices to:
apply a transform selected for a block to residual values calculated based on predictions that use different prediction techniques for two or more nodes of the block; and
signal the transform selected for the block at a block-level.

8. The one or more non-transitory, computer-readable storage media of claim 7, wherein:
a first transform is signaled at the block-level for decompressing attribute values of the nodes; and
a different transform is signaled at the block-level for decompressing geometry values of the nodes.

9. The one or more non-transitory, computer-readable storage media of claim 7, wherein a quantization parameter to be applied to coefficients resulting from the transform being applied to the residual values is signaled at the block-level.

10. The one or more non-transitory, computer-readable storage media of claim 1, wherein the program instructions cause the one or more computing devices to:
apply a transform to residual attribute values for nodes of a block, wherein the transform transforms the residual attribute values of the nodes of the block into transfer function coefficients, and wherein the transform determines the transform function coefficients based on:
relationships between the block and other blocks of the prediction tree; and
geometry relationships between the nodes of the block in a geometry of the point cloud.

11. The one or more non-transitory, computer-readable storage media of claim 1, wherein the program instructions cause the one or more computing devices to:
perform a rate distortion optimization (RDO) analysis to determine a number of nodes to be included in the blocks.

12. The one or more non-transitory, computer-readable storage media of claim 1, wherein the program instructions cause the one or more computing devices to:
apply a transform to residual attribute values for nodes of a block, wherein the transform is selected from a set of supported transforms, comprising:
a one-dimensional discrete cosine transform;
a wavelet transform;
a discrete wavelet transform;
a Haar transform;
a Hadamard transform;
a graph transform; or
a lifting scheme.

13. The one or more non-transitory, computer-readable storage media of claim 1, wherein the program instructions cause the one or more computing devices to:
determine respective nodes values for nodes of a block using prediction techniques applied to one or more ancestor nodes of respective nodes being predicted, wherein the prediction techniques are selected from a set of supported prediction techniques comprising:
not predicted, wherein a spatial location node value for a child node is coded without prediction;
a delta prediction technique, wherein a spatial location node value for a child node is predicted as a difference from a spatial location node value of the parent node;
a linear prediction technique, wherein a spatial location node value for a child node is predicted based on a relationship between the parent node and the grandparent node of the child node; and
a parallelogram prediction technique, wherein a spatial location node value for a child node is determined based on a relationship between the parent node, the grandparent node, and the great grandparent node of the child node.

14. A system, comprising:
a memory storing program instructions, and
one or more processors configured to execute the program instructions to:
compress geometric information for a point cloud, wherein to compress the geometric information, the program instructions cause the one or more computing devices to:
generate a prediction tree comprising a plurality of nodes, wherein:
respective ones of the nodes correspond to points in a one-to-one relationship, wherein the respective points make up the point cloud,
the plurality of points are captured from one or more sensors,
the respective ones of the points comprise spatial location information for the respective point,
geometric prediction using a parent, grand-parent, or great-grandparent node is used to determine the respective nodes of the prediction tree that correspond to the respective points of the point cloud, and
spatial locations of the points of the point cloud are represented in a compressed form in the prediction tree via the nodes of the prediction tree;
identify different segments of the prediction tree according to a graph traversal technique;
divide the segments into respective blocks, wherein spatial location node values of nodes included in the respective blocks are predicted based on spatial location node values of nodes included in one or more predecessor blocks in the segment;
encode residual values for the spatial location node values of the blocks of the prediction tree to encode the geometric information for the point cloud; and
send or store the encoded blocks for the point cloud.

15. The system of claim 14, further comprising:
the one or more sensors, wherein the one or more sensors are LIDAR sensors.

16. A method of compressing geometric information for a point could, the method, comprising:

generating a prediction tree comprising a plurality of nodes, wherein:
respective ones of the nodes correspond to respective points in a one-to-one relationship, wherein the respective make up the point cloud,
the respective ones of the points comprise spatial location information for the respective point,
geometric prediction using a parent, grand-parent, or great-grandparent node is used to determine the respective nodes of the prediction tree that correspond to the respective points of the point cloud, and
spatial locations of the points of the point cloud are represented in a compressed form in the prediction tree via the nodes of the prediction tree;
identifying different segments of the prediction tree according to a graph traversal technique;
dividing the segments into respective blocks, wherein spatial location node values of nodes included in the respective blocks are predicted based on spatial location node values of nodes included in one or more predecessor blocks in the segment; and
encoding the blocks of the prediction tree to encode the geometric information for the point cloud; and
sending or storing the encoded blocks for the point cloud.

17. The method of claim 16, wherein said encoding the blocks of the prediction tree comprises:
applying a transform to residual values of the blocks of the prediction tree; and
applying quantization to coefficients generated from the transformed residual values of the blocks of the prediction tree.

18. The method of claim 16, wherein said identifying different segments of the prediction tree according to the graph traversal technique comprises:

traversing nodes of the prediction tree from a root node of the prediction tree to a first leaf node of the prediction tree to identify a first segment of the segments; and
iteratively traversing other nodes of the prediction tree from next nodes identified according to the graph traversal technique to other leaf nodes until remaining nodes in the prediction tree are included in another one of the segments.

19. The method of claim 16, further comprising:
determining respective nodes values for nodes of a block using prediction techniques applied to one or more ancestor nodes of respective nodes being predicted, wherein the prediction techniques are selected from a set of supported prediction techniques comprising two or more of:
not predicted, wherein a spatial location node value for a child node is coded without prediction;
a delta prediction technique, wherein a spatial location node value for a child node is predicted as a difference from a spatial location node value of the parent node;
a linear prediction technique, wherein a spatial location node value for a child node is predicted based on a relationship between the parent node and the grandparent node of the child node; or
a parallelogram prediction technique, wherein a spatial location node value for a child node is determined based on a relationship between the parent node, the grandparent node, and the great grandparent node of the child node.

20. The method of claim 16, wherein respective prediction techniques to be used to predict spatial location node values for the nodes of the prediction tree are signaled at a block level.

* * * * *